US012544883B2

(12) United States Patent
Nick et al.

(10) Patent No.: US 12,544,883 B2
(45) Date of Patent: Feb. 10, 2026

(54) POWER TOOL WITH LIGHTING ASSEMBLY AND WIRE PASSAGEWAY

(71) Applicant: MILWAUKEE ELECTRIC TOOL CORPORATION, Brookfield, WI (US)

(72) Inventors: Mackenzie J. Nick, Theresa, WI (US); Joseph T. Lottes-Paukner, Sussex, WI (US); Joseph J. Drees, Wauwatosa, WI (US); Benjamin J. Skelton, Milwaukee, WI (US); Scott R. Fischer, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/602,954

(22) Filed: Mar. 12, 2024

(65) Prior Publication Data

US 2024/0308035 A1 Sep. 19, 2024

Related U.S. Application Data

(60) Provisional application No. 63/515,027, filed on Jul. 21, 2023, provisional application No. 63/489,932, filed on Mar. 13, 2023.

(51) Int. Cl.

| | |
|---|---|
| ***B25B 21/02*** | (2006.01) |
| ***B25B 23/18*** | (2006.01) |
| ***B25F 5/02*** | (2006.01) |

(52) U.S. Cl.
CPC .............. *B25B 21/02* (2013.01); *B25B 23/18* (2013.01); *B25F 5/02* (2013.01)

(58) Field of Classification Search
CPC ............ B25B 21/02; B25B 23/18; B25F 5/02
See application file for complete search history.

(56) References Cited

U.S. PATENT DOCUMENTS

| | | |
|---|---|---|
| 2,310,166 A | 2/1943 | Way |
| 2,525,588 A | 10/1950 | Cameron et al. |

(Continued)

FOREIGN PATENT DOCUMENTS

| | | |
|---|---|---|
| CN | 201201230 Y | 3/2009 |
| CN | 201470941 U | 5/2010 |

(Continued)

OTHER PUBLICATIONS

U.S. Appl. No. 18/699,728, filed Apr. 9, 2024, by Nick et al. (Copy not submitted herewith pursuant to the waiver of 37 C.F. R. § 1.98(a)(2)(iii) issued by the Office on Oct. 19, 2004).

(Continued)

*Primary Examiner* — Lucas E. A. Palmer
(74) *Attorney, Agent, or Firm* — Michael Best & Friedrich LLP

(57) ABSTRACT

A power tool includes a housing having a primary housing and a secondary housing coupled to the primary housing, a motor supported within the primary housing, an output member driven by the motor and extending from the secondary housing, a circuit board assembly supported within the primary housing, a passageway at least partially formed by the secondary housing, and a lighting assembly coupled to the secondary housing. The lighting assembly includes a light source configured to illuminate a workpiece, a wire extending from the circuit board assembly to the lighting assembly through the passageway, and a sleeve positioned in the passageway and surrounding at least a portion of the wire.

20 Claims, 13 Drawing Sheets

(56) References Cited

U.S. PATENT DOCUMENTS

| | | | |
|---|---|---|---|
| 5,267,129 | A | 11/1993 | Anderson |
| 6,494,590 | B1 | 12/2002 | Paganini et al. |
| 6,886,961 | B2 | 5/2005 | Hara et al. |
| 6,981,779 | B2 | 1/2006 | Fukuoka |
| 7,137,761 | B2 | 11/2006 | Hara et al. |
| 7,185,998 | B2 | 3/2007 | Oomori et al. |
| 7,253,541 | B2 | 8/2007 | Kovarik et al. |
| 7,677,752 | B2 | 3/2010 | Tadokoro et al. |
| 7,850,325 | B2 | 12/2010 | Wall et al. |
| 7,934,847 | B2 | 5/2011 | Oomori et al. |
| 8,075,155 | B2 | 12/2011 | Watanabe et al. |
| 8,317,350 | B2 * | 11/2012 | Friedman ........... B23Q 17/2404 362/120 |
| 8,328,308 | B2 | 12/2012 | Kurashina |
| 8,328,381 | B2 | 12/2012 | Dixon et al. |
| 8,446,120 | B2 | 5/2013 | Forster et al. |
| 8,496,366 | B2 * | 7/2013 | Leong ..................... B25B 21/02 362/446 |
| 8,506,108 | B2 | 8/2013 | Friedman et al. |
| 8,517,558 | B2 | 8/2013 | Oomori et al. |
| 8,616,300 | B2 | 12/2013 | Suzuki et al. |
| 8,653,787 | B2 | 2/2014 | Cunanan et al. |
| 8,796,995 | B2 | 8/2014 | Cunanan et al. |
| 8,820,955 | B2 | 9/2014 | Dixon et al. |
| 8,827,483 | B2 | 9/2014 | Dixon et al. |
| 8,833,485 | B2 | 9/2014 | Svennung et al. |
| 8,981,680 | B2 | 3/2015 | Suda et al. |
| 8,988,015 | B2 | 3/2015 | Forster et al. |
| 9,000,882 | B2 | 4/2015 | Velderman et al. |
| 9,028,088 | B2 * | 5/2015 | Vanko ....................... B25F 5/00 362/120 |
| 9,071,069 | B2 | 6/2015 | Brotto et al. |
| 9,114,512 | B2 | 8/2015 | Beer et al. |
| 9,138,846 | B2 | 9/2015 | Svennung et al. |
| 9,209,642 | B2 | 12/2015 | Cunanan et al. |
| 9,225,275 | B2 | 12/2015 | Sterling et al. |
| 9,289,832 | B2 | 3/2016 | Kishima et al. |
| 9,302,376 | B2 | 4/2016 | Agehara et al. |
| 9,328,915 | B2 | 5/2016 | Vanko et al. |
| 9,352,458 | B2 | 5/2016 | Friedman et al. |
| 9,401,250 | B2 | 7/2016 | Velderman et al. |
| 9,406,457 | B2 | 8/2016 | Velderman et al. |
| 9,413,088 | B2 | 8/2016 | Brotto et al. |
| 9,444,269 | B2 | 9/2016 | Wohltmann et al. |
| 9,458,996 | B2 | 10/2016 | Francis et al. |
| 9,461,379 | B2 | 10/2016 | Cunanan et al. |
| 9,481,081 | B2 | 11/2016 | Hecht et al. |
| 9,508,498 | B2 | 11/2016 | Forster et al. |
| 9,539,691 | B2 | 1/2017 | Hirschburger |
| 9,561,548 | B2 | 2/2017 | Kishima et al. |
| 9,570,822 | B2 | 2/2017 | Cunanan et al. |
| 9,573,257 | B2 | 2/2017 | Kynast et al. |
| 9,644,837 | B2 | 5/2017 | Vanko et al. |
| 9,692,157 | B2 | 6/2017 | Brotto et al. |
| 9,722,334 | B2 | 8/2017 | Sterling et al. |
| 9,844,849 | B2 | 12/2017 | Hayashi et al. |
| 9,878,435 | B2 | 1/2018 | Ito |
| 9,914,204 | B2 | 3/2018 | Hosking |
| 9,960,509 | B2 | 5/2018 | Sterling et al. |
| 9,966,774 | B2 | 5/2018 | Wohltmann et al. |
| 10,027,140 | B2 | 7/2018 | Cunanan et al. |
| 10,040,181 | B2 | 8/2018 | Fu et al. |
| 10,052,733 | B2 | 8/2018 | Ely et al. |
| 10,256,697 | B2 | 4/2019 | Velderman et al. |
| 10,272,548 | B2 | 4/2019 | Wei et al. |
| 10,486,291 | B2 * | 11/2019 | Bartoszek ............... B25B 23/18 |
| 10,486,296 | B2 | 11/2019 | Ito |
| 10,525,582 | B2 | 1/2020 | Qiu et al. |
| 10,543,588 | B2 | 1/2020 | Vanko et al. |
| 10,651,706 | B2 | 5/2020 | Forster et al. |
| 10,666,068 | B2 | 5/2020 | Cunanan et al. |
| 10,686,319 | B2 | 6/2020 | Wohltmann et al. |
| 10,749,353 | B2 | 8/2020 | Tsuruta et al. |
| 10,821,595 | B2 | 11/2020 | Qiu et al. |
| 10,836,019 | B2 | 11/2020 | Matsushita et al. |
| 10,926,368 | B2 | 2/2021 | Chellew |
| 10,960,509 | B2 | 3/2021 | Ely et al. |
| 11,090,786 | B2 | 8/2021 | Puzio |
| 11,095,239 | B2 | 8/2021 | Delose et al. |
| 11,278,973 | B2 | 3/2022 | Nagasaka et al. |
| 11,890,731 | B2 | 2/2024 | Hozumi |
| 2006/0104085 | A1 | 5/2006 | Walker et al. |
| 2006/0262519 | A1 | 11/2006 | Hirschburger et al. |
| 2007/0256914 | A1 | 11/2007 | Lohr et al. |
| 2008/0074865 | A1 | 3/2008 | Lutz et al. |
| 2009/0141482 | A1 * | 6/2009 | Wall ........................ B25F 5/021 362/119 |
| 2010/0072833 | A1 * | 3/2010 | Canino .................. B25F 5/021 310/50 |
| 2010/0214768 | A1 * | 8/2010 | Dixon ..................... B25F 5/021 362/119 |
| 2011/0058356 | A1 * | 3/2011 | Friedman ................ B25F 5/021 362/119 |
| 2014/0232326 | A1 | 8/2014 | Wohltmann et al. |
| 2014/0262394 | A1 | 9/2014 | Scott et al. |
| 2016/0354889 | A1 * | 12/2016 | Ely .................... B23Q 17/2404 |
| 2018/0126538 | A1 * | 5/2018 | Qiu ...................... G02B 6/0021 |
| 2019/0070720 | A1 | 3/2019 | Rabe et al. |
| 2020/0047322 | A1 | 2/2020 | Ito |
| 2020/0101587 | A1 | 4/2020 | Niwa |
| 2020/0114499 | A1 | 4/2020 | Vanko et al. |
| 2020/0130164 | A1 | 4/2020 | Qiu et al. |
| 2020/0198100 | A1 | 6/2020 | Schneider et al. |
| 2020/0235638 | A1 | 7/2020 | Velderman |
| 2020/0295579 | A1 | 9/2020 | Wohltmann et al. |
| 2021/0122017 | A1 | 4/2021 | Kelly |
| 2021/0222866 | A1 * | 7/2021 | Niwa .................... F21V 33/008 |
| 2021/0260733 | A1 | 8/2021 | Fischer et al. |
| 2022/0009064 | A1 | 1/2022 | Puzio |
| 2023/0366533 | A1 * | 11/2023 | Chikaraishi ............... B25F 5/02 |
| 2024/0058937 | A1 * | 2/2024 | Chikaraishi ............... B25F 5/02 |
| 2024/0075609 | A1 * | 3/2024 | Zhao ......................... B25F 5/02 |
| 2024/0208013 | A1 | 6/2024 | Hirabayashi et al. |

FOREIGN PATENT DOCUMENTS

| | | | |
|---|---|---|---|
| CN | 103231350 | A | 8/2013 |
| CN | 204209605 | U | 3/2015 |
| CN | 204470650 | U | 7/2015 |
| CN | 105798356 | A | 7/2016 |
| CN | 205765866 | U | 12/2016 |
| CN | 106393010 | A | 2/2017 |
| CN | 205938750 | U | 2/2017 |
| CN | 106475977 | A | 3/2017 |
| CN | 106625452 | A | 5/2017 |
| CN | 206344094 | U | 7/2017 |
| CN | 206605460 | U | 11/2017 |
| CN | 208867076 | U | 5/2019 |
| CN | 208961941 | U | 6/2019 |
| CN | 110170953 | A | 8/2019 |
| CN | 210173433 | U | 3/2020 |
| CN | 214418661 | U | 10/2021 |
| CN | 216030486 | U | 3/2022 |
| DE | 102011075663 | A1 | 11/2012 |
| DE | 102012009981 | A1 | 11/2012 |
| DE | 102011103656 | A1 | 12/2012 |
| DE | 102012205274 | A1 | 10/2013 |
| DE | 102012211580 | A1 | 1/2014 |
| DE | 102015214522 | A1 | 2/2017 |
| DE | 102015226420 | A1 | 6/2017 |
| EP | 3473383 | A1 | 4/2019 |
| EP | 3015224 | B1 | 4/2020 |
| EP | 3212359 | B1 | 1/2024 |
| JP | 2001057293 | A | 2/2001 |
| JP | 2019025636 | A | 2/2019 |
| TW | M487960 | U | 10/2014 |
| WO | 2013136917 | A1 | 9/2013 |
| WO | 2019052920 | A1 | 3/2019 |
| WO | 2019170331 | A1 | 9/2019 |

(56) References Cited

FOREIGN PATENT DOCUMENTS

| | | | |
|---|---|---|---|
| WO | 2021252702 | A1 | 12/2021 |
| WO | 2023086237 | A1 | 5/2023 |

OTHER PUBLICATIONS

Extended European Search Report for Application No. 24162820.5 dated Sep. 13, 2024 (7 pages).

* cited by examiner

POWER TOOL WITH LIGHTING ASSEMBLY AND WIRE PASSAGEWAY

CROSS-REFERENCE TO RELATED APPLICATIONS

This application claims priority to U.S. Provisional Patent Application No. 63/515,027, filed on Jul. 21, 2023, and to U.S. Provisional Patent Application No. 63/489,932, filed Mar. 13, 2023, the entire contents of all of which are incorporated herein by reference.

FIELD

The present disclosure relates to lighting assemblies, such as shadowless lighting assemblies, for power tools, and, more particularly, to wire pathways for such lighting assemblies.

BACKGROUND

Some power tools may include a work light located on a front surface of the power tool configured to illuminate a working area of the power tool. For example, an impact tool (e.g., a high-torque impact wrench) may include a single light-emitting diode (LED) positioned near an output unit that is configured to transfer rotational energy from the high-torque impact wrench to a fastener. While the high-torque impact wrench is being operated by a user, the LED may illuminate the fastener so that the user can more easily see the fastener. However, using a single LED may cause a shadow to be cast by the output unit, which can negatively affect the visibility of the fastener. To address this problem, a power tool may include multiple LEDs positioned radially around the output unit or end tool of the power tool. Providing multiple LEDs around the output unit creates even lighting applied to all sides of the output unit or end tool, which prevents shadows from being cast. This type of lighting may be generally referred to as shadowless lighting.

SUMMARY

While shadowless lighting helps to improve the visibility of the fastener, implementing shadowless lighting in a power tool (e.g., on a front surface of a case) can raise additional issues. For example, each LED mounted to the front surface of the power tool may require multiple wires to provide power and/or control signals to the LEDs. As more LEDs are included, more wires may be needed. Therefore, power tools implementing shadowless lighting require an efficient method to locate these wires in the limited space provided within a handheld power tool.

In some aspects, the techniques described herein relate to a power tool including: a housing including a primary housing and a secondary housing coupled to the primary housing; a motor supported within the primary housing; an output member driven by the motor and extending from the secondary housing; a circuit board assembly supported within the primary housing; a passageway at least partially formed by the secondary housing; and a lighting assembly coupled to the secondary housing, the lighting assembly including a light source configured to illuminate a workpiece, and a wire extending from the circuit board assembly to the lighting assembly through the passageway, and a sleeve positioned in the passageway and surrounding at least a portion of the wire.

In some aspects, the techniques described herein relate to a power tool, wherein the primary housing includes a motor housing portion in which the motor is supported and a handle portion extending from the motor housing portion, and wherein the circuit board assembly is supported within the handle portion.

In some aspects, the techniques described herein relate to a power tool, wherein the passageway includes a first end, a second end opposite the first end, and an intermediate portion between the first and second ends, and wherein a cross-sectional area of the passageway increases from the intermediate portion toward the first end.

In some aspects, the techniques described herein relate to a power tool, wherein the cross-sectional area of the passageway increases from the intermediate portion toward the second end, such that the intermediate portion defines a minimum cross-sectional area of the passageway.

In some aspects, the techniques described herein relate to a power tool, wherein the sleeve is a first sleeve received between the first end and the intermediate portion, and wherein the power tool further includes a second sleeve received between the second end and the intermediate portion.

In some aspects, the techniques described herein relate to a power tool, wherein the first sleeve and the second sleeve are plugs that are compressed within the passageway.

In some aspects, the techniques described herein relate to a power tool, wherein the secondary housing is molded using a mold assembly, and wherein a parting line of the mold assembly extending through the intermediate portion.

In some aspects, the techniques described herein relate to a power tool, wherein the light source is a first light source, and wherein the lighting assembly further includes a second light source and a third light source.

In some aspects, the techniques described herein relate to a power tool, wherein the first, second, and third light sources are offset from one another by 120 degrees.

In some aspects, the techniques described herein relate to a power tool, wherein the secondary housing includes a wall defining a recess, and wherein the power tool further includes a cover received within the recess.

In some aspects, the techniques described herein relate to a power tool, wherein the passageway is defined between the cover and the wall.

In some aspects, the techniques described herein relate to a power tool, wherein the wall and the cover are generally U-shaped.

In some aspects, the techniques described herein relate to a power tool, wherein the secondary housing includes a cylindrical interior surface, and wherein the cover includes a top wall substantially flush with the cylindrical interior surface.

In some aspects, the techniques described herein relate to a power tool, wherein the secondary housing and the cover include different materials.

In some aspects, the techniques described herein relate to a power tool, wherein the sleeve is made of fiberglass.

In some aspects, the techniques described herein relate to a power tool including: a housing including a primary housing and a secondary housing coupled to the primary housing; a motor supported within the primary housing; an output member driven by the motor and extending from the secondary housing; a circuit board assembly supported within the primary housing; a passageway defined between a wall extending along a bottom side of the secondary housing and a cover; and a lighting assembly coupled to the secondary housing, the lighting assembly including a light source configured to illuminate a workpiece, and a wire extending from the circuit board assembly to the lighting assembly through the passageway.

In some aspects, the techniques described herein relate to a power tool, wherein the output member is configured to rotate about an axis, and wherein both the circuit board and the passageway extend parallel to the axis.

In some aspects, the techniques described herein relate to a power tool, further including a drive assembly having a camshaft driven by the motor and a hammer configured to reciprocate along the camshaft, and wherein the cover separates the wire from the hammer.

In some aspects, the techniques described herein relate to a power tool including: a housing including a primary housing and a secondary housing coupled to the primary housing; a motor supported within the primary housing; an output member driven by the motor about an axis and extending from the secondary housing; a circuit board assembly supported within the primary housing; a passageway defined by a bore extending through the secondary housing in a direction parallel to the axis; and a lighting assembly coupled to the secondary housing, the lighting assembly including a light source configured to illuminate a workpiece, and a wire extending from the circuit board assembly to the lighting assembly through the passageway, and a sleeve positioned in the passageway and surrounding at least a portion of the wire.

In some aspects, the techniques described herein relate to a power tool, wherein the sleeve is made of fiberglass.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
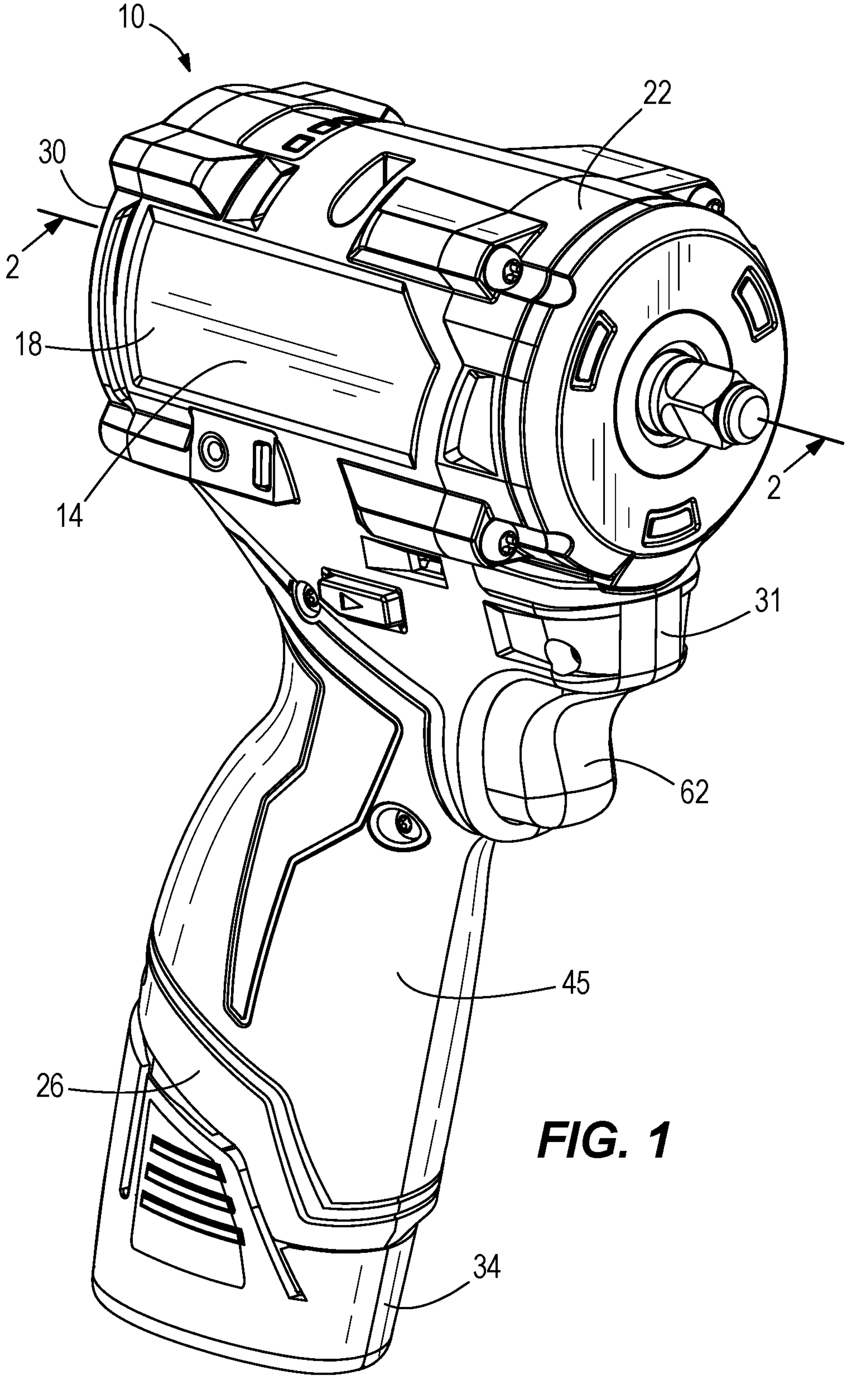
FIG. 1 is a perspective view of a power tool according to an embodiment of the disclosure.
Figure 5:
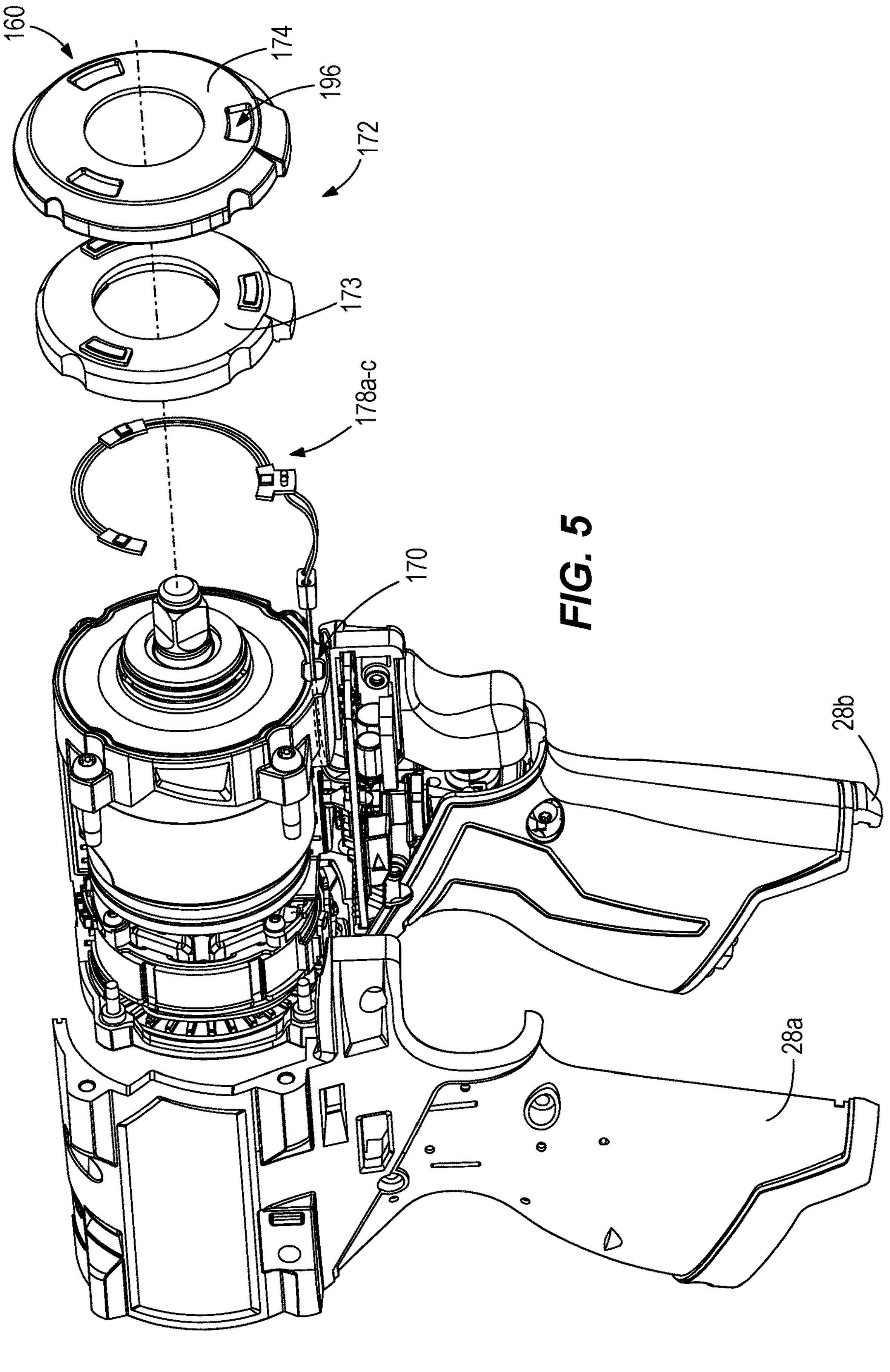
FIG. 5 is a partially exploded perspective view of the power tool of FIG. 1, further illustrating the lighting assembly.

FIG. 1 illustrates an embodiment of a power tool 10 in the form of a rotary impact tool, and, more specifically, an impact wrench, which includes a shadowless lighting system. The power tool 10 includes a primary housing 14 with a motor housing portion 18. A secondary housing 22 (which may also be referred to as an impact case or hammer case) is coupled to the primary housing 14. The illustrated primary housing 14 includes a handle portion 26 extending downwardly from the motor housing portion 18. In the illustrated embodiment, the handle portion 26 and the motor housing portion 18 are defined by cooperating first and second clamshell halves or housing portions 28*a*, 28*b* (FIG. 5). The secondary housing 22 may be integrally formed as a single piece and coupled to the primary housing 14 by a plurality of fasteners or other suitable means.

In the illustrated embodiment, an end cap 30 is coupled to the motor housing portion 18 opposite the secondary housing 22. The clamshell halves 28*a*, 28*b* can be coupled (e.g., fastened) together at an interface or seam 31. In the illustrated embodiment, the end cap 30 is continuous and may be pressed or fitted over a rear end of the clamshell halves 28*a*, 28*b*. In other words, the end cap 30 may not include two halves such that the end cap 30 may extend over the seam 31. The end cap 30 is coupled to the motor housing portion 18 by a plurality of fasteners. In yet other embodiments, the power tool 10 may not include a separate end cap, such that the clamshell halves 28*a*, 28*b* instead define the rear end of the motor housing portion 18.

Figure 2:
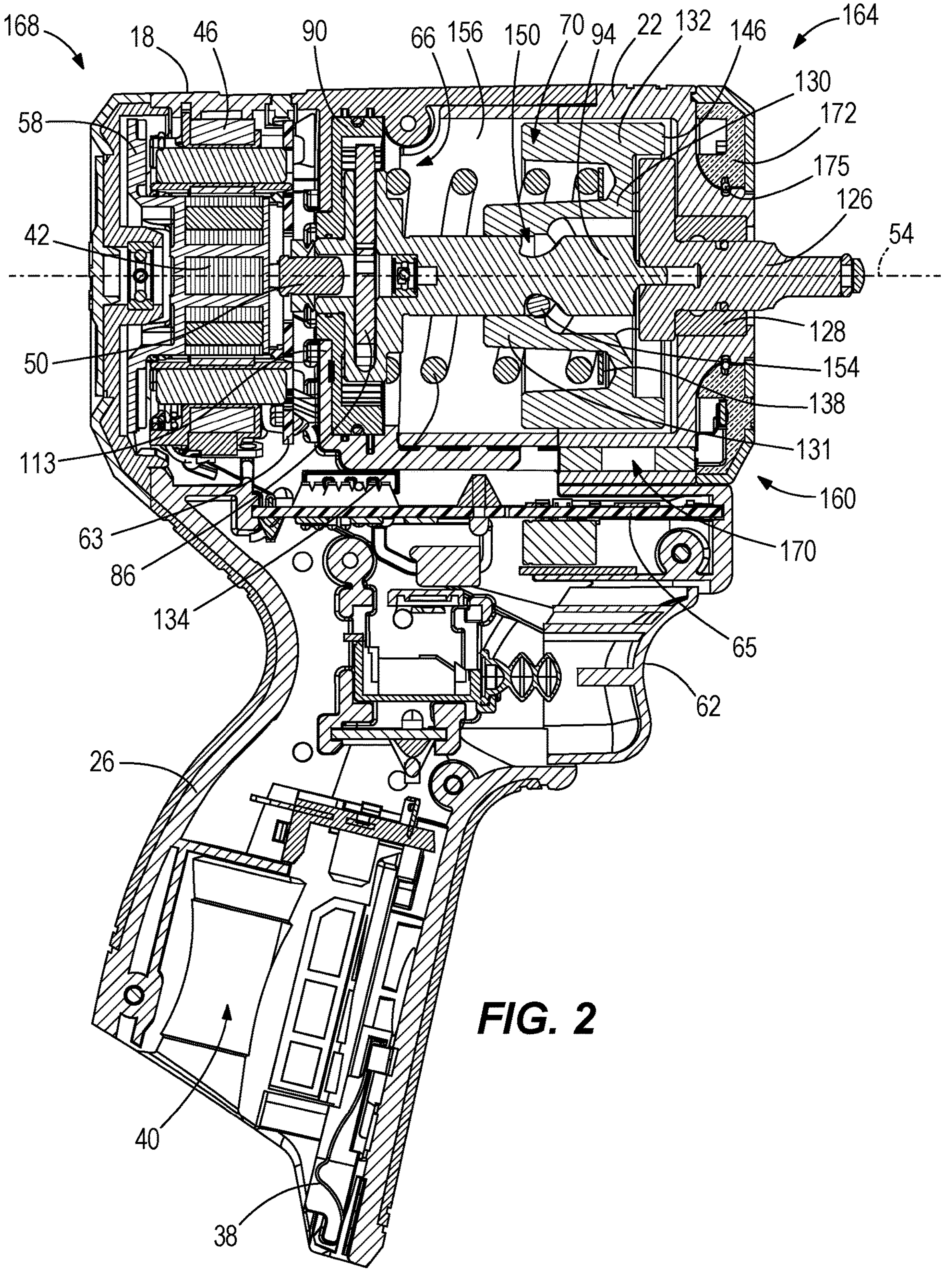
FIG. 2 is a cross-sectional view of the power tool of FIG. 1.

Referring to FIGS. 1 and 2, the power tool 10 includes a battery 34 removably coupled to a battery receptacle 38, which in the illustrated embodiment, includes a cavity 40 extending into the handle portion 26. A motor 42 is supported within the motor housing portion 18 and receives power from the battery 34 via connections, pads, and/or battery terminals in the battery receptacle 38 when the battery 34 is coupled to the battery receptacle 38. In the illustrated embodiment, the handle portion 26 of the clamshell halves 28*a*, 28*b* can be covered or surrounded by a grip portion 45, which may be overmolded on the handle portion 26.

The battery 34 may be a power tool battery pack generally used to power a power tool, such as an electric drill, an electric saw, and the like (e.g., a 12 volt rechargeable battery pack). The battery 34 may include lithium ion (Li-ion) cells. The 12-volt nominal output voltage of the battery 34 provides an optimal balance between weight/size and power in the illustrated power tool 10; however, batteries with other nominal voltages may be used in other embodiments.

With specific reference to FIG. 2, the motor 42 is a brushless direct current ("BLDC") motor with a stator 46 and a rotor with an output shaft 50 that is rotatable about an axis 54 relative to the stator 46. A fan 58 is coupled to the output shaft 50 behind the motor 42 to generate airflow for cooling the motor 42 and/or other components of the power tool 10.

With continued reference to FIG. 2, the power tool 10 includes a trigger 62 (which may include an actuator and a trigger switch) supported by the primary housing 14 that selectively electrically connects the motor 42 (e.g., via suitable control circuitry provided on one or more printed circuit board assemblies ("PCBAs")) and the battery 34 to provide DC power to the motor 42. In other embodiments, the power tool 10 may include a power cord for electrically connecting the trigger 62 and the motor 42 to a source of AC power. As a further alternative, the power tool 10 may be configured to operate using a different power source (e.g., a pneumatic or hydraulic power source, etc.).

In the illustrated embodiment, a first PCBA 63 is supported within the motor housing portion 18 of the primary housing 14 adjacent a front end of the stator 46. The illustrated first PCBA 63 extends perpendicular to the axis 54 and may include one or more Hall-Effect sensors, which provide feedback for controlling the motor 42. A second PCBA 65 is supported within the primary housing 14 (e.g., at an upper end of the handle portion 26 and/or a lower end of the motor housing portion 18) and extends generally parallel to the axis 54. The second PCBA 65 is in electrical communication with the motor 42, a switch element of the trigger 62, and terminals of the battery receptacle 38. In the illustrated embodiment, the second PCBA 65 includes a plurality of semi-conductor switching elements (e.g., MOSFETs, IGBTs, or the like) that control and distribute power to windings in the stator 46 in order to cause rotation of the rotor and output shaft 50. The second PCBA 65 may also include one or more microprocessors, machine-readable, non-transitory memory elements, and other electrical or electronic elements for providing operational control to the power tool 10. In some embodiments, the first PCBA 63 may be omitted, and the motor 42 may be configured for sensorless control via the second PCBA 65. The positions of the first PCBA 63 and/or the second PCBA 65 within the primary housing 14 may vary in some embodiments.

Referring still to FIG. 2, the illustrated power tool 10 includes a gear assembly 66 driven by the output shaft 50 and an impact mechanism 70 coupled to an output of the gear assembly 66. The impact mechanism 70 may also be referred to herein as a drive assembly 70. The gear assembly 66 provides a speed reduction between the output shaft 50 and an input of the drive assembly 70.

With reference to FIG. 2, the gear assembly 66 includes a pinion gear (not shown) coupled to the output shaft 50 of the motor 42, a plurality of planet gears 86 meshed with the pinion gear, and a ring gear 90 meshed with the planet gears 86 and rotationally fixed within the primary housing 14. A rearward facing side of the ring gear 90 is seated against a dividing wall 113 formed by the clamshell halves **28*a*, 28*b* (FIG. 5). The illustrated ring gear 90 is directly supported by the clamshell halves 28*a*, 28*b*. In other embodiments, the ring gear 90 may be supported by a gear case, which in turn may be supported by the clamshell halves 28*a*, 28*b***.

The planet gears 86 are coupled to a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotates the camshaft 94. The drive assembly 70 also includes an anvil 126, extending from the secondary housing 22, to which a tool element (e.g., a socket, not shown) can be coupled for performing work on a workpiece (e.g., a fastener). The drive assembly 70 is configured to convert the constant rotational force or torque provided by the gear assembly 66 to a striking rotational force or intermittent applications of torque to the anvil 126 when the reaction torque on the anvil 126 (e.g., due to engagement between the tool element and a fastener being worked upon) exceeds a certain threshold. In the illustrated embodiment of the power tool 10, the drive assembly 70 includes the camshaft 94, a hammer 130 supported on and axially slidable relative to the camshaft 94, and the anvil 126. Stated another way, the hammer 130 is configured to reciprocate axially along the camshaft 94 and impart periodic rotational impacts to the anvil 126 in response to rotation of the camshaft 94.

The hammer 130 includes a first hammer portion 131 and a second hammer portion 132. The first hammer portion 131 is provided, or extends, behind the second hammer portion 132 along an axial direction of the power tool 10, and the second hammer portion 132 is larger (e.g., diameter) than the first hammer portion 131. The drive assembly 70 further includes a spring 134 that biases the hammer 130 toward the front of the power tool 10. In other words, the spring 134 biases the hammer 130 in an axial direction toward the anvil 126, along the axis 54. A thrust bearing 138 is positioned between the spring 134 and the hammer 130. The thrust bearing 138 allows for the spring 134 and the camshaft 94 to continue to rotate relative to the hammer 130 after each impact strike when hammer lugs 146 (FIG. 9) on the hammer 130 engage with corresponding anvil lugs 147 (FIG. 9) and rotation of the hammer 130 momentarily stops. In the illustrated embodiment, the anvil 126 is rotationally supported by a bushing 128, which is in turn supported within a projecting nose portion at the front end of the secondary housing 22.

The camshaft 94 includes cam grooves 150 in which corresponding cam balls 154 are received (although only one cam ball is illustrated in FIG. 2). The cam balls 154 are in driving engagement with the hammer 130 and movement of the cam balls 154 within the cam grooves 150 allows for relative axial movement of the hammer 130 along the camshaft 94 when the hammer lugs 146 and the anvil lugs are engaged and the camshaft 94 continues to rotate. The axial movement of the hammer 130 compresses the spring 134, which then releases its stored energy to propel the hammer 130 forward and rotate the hammer 130 once the hammer lugs 146 clear the anvil lugs.

Referring still to FIG. 2, the gear assembly 66 and drive assembly 70 may be coated with a lubricant, such as grease or oil, which assists in smooth operation of the power tool 10 by minimizing friction between movable components. As such, the power tool 10 includes an intermediate case 156 positioned in abutment with the secondary housing 22 at one end of the intermediate case 156 and positioned in abutment with interior portions of the primary housing 14 at the other end of the intermediate case 156. In the illustrated embodiment, the intermediate case 156 is secured between the secondary housing 22 and the primary housing 14 with an interference fit that inhibits lubricant from escaping from the gear assembly 66 and the drive assembly 70.

The power tool 10 further includes a lighting assembly 160 positioned at a front or first end 164 of the power tool 10, which is generally opposite a rear or second end 168 (defined by the cap 30 in the illustrated embodiment). The illustrated lighting assembly 160 is coupled directly to the secondary housing 22. A passage 170 is defined by a bore that extends through the secondary housing 22 in a direction generally parallel to the axis 54. As described in greater detail below, wires for providing power and/or operational control to the lighting assembly 160 extend through the passage 170, beyond a rear end of the secondary housing 22, and ultimately to the second PCBA 65.

One or both of the PCBAs 63, 65 may include one or more electronic components that may implement a control system of the power tool 10. For example, the PCBAs 63, 65 may include an electronic processor configured to receive power from a power supply (e.g., the battery 34) connected to the power tool 10. The electronic processor may be configured to control whether power is provided to the lighting assembly 160 and/or the motor 42. The PCBAs 63, 65 may also include switching elements (e.g., field-effect transistors) that are controlled by the electronic processor to selectively provide power to coils of the motor 42 to allow operation thereof. In other embodiments, the PCBA 63, 65 may include additional or alternative components. In some embodiments, the lighting assembly 160 may be activated in response to a user's operation of the trigger 62.

Figure 3:
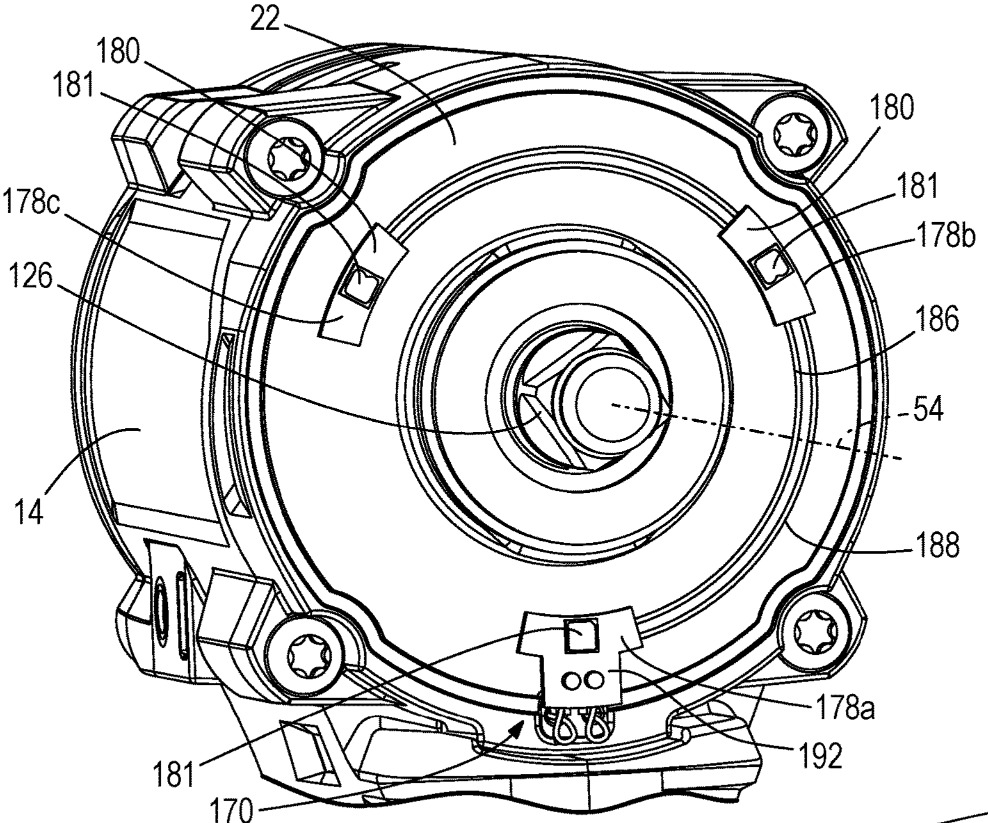
FIG. 3 is a partial perspective view of the power tool of FIG. 1, illustrating a lighting assembly of the power tool.
Figure 4:
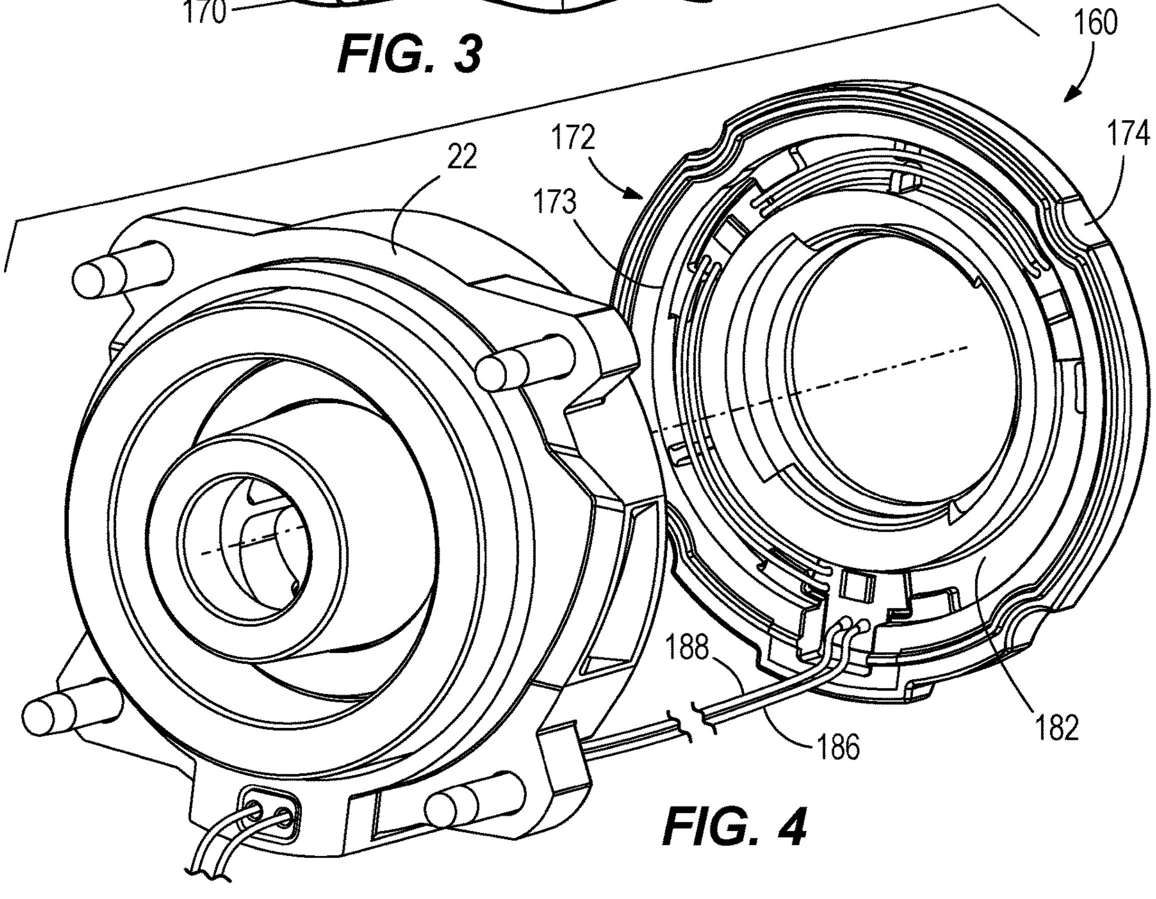
FIG. 4 is an exploded rear perspective view of a portion of the power tool of FIG. 1, further illustrating the lighting assembly.

Referring to FIGS. 2-5, the lighting assembly 160 includes a light housing 172. As shown in FIG. 4, the illustrated light housing 172 includes a body 173 and a cap 174 (FIG. 4). The cap 174 may be an elastomeric layer overmolded on the body 173 to provide the lighting assembly 160 with protection and impact resistance (e.g., from drops, etc.). In other embodiments, the cap 174 may be coupled to the body 173 via a snap-fit, adhesive, fasteners, or the like, or the cap 174 may be omitted. The illustrated light housing 172 is coupled to the secondary housing 22 by a retaining ring 175 (e.g., a snap ring) disposed in complementary grooves on the secondary housing 22 and the light housing 172 (FIG. 2). In other embodiments, the light housing 172 may be coupled to the secondary housing 22 in other ways.

Referring to FIGS. 3-4, the illustrated lighting assembly 160 includes multiple light-emitting diode ("LED") assemblies 178*a*, 178*b*, 178*c*, which may each be supported on an interior surface 182 of the of the light housing 172. In other embodiments, the lighting assembly 160 may include light sources other than LEDs. Power may be provided to each LED assembly 178*a*, 178*b*, 178*c* by wires 186, 188 routed from the second PCBA 65, through the passage 170 of the secondary housing 22, and to a first LED assembly 178*a*. In general, each LED assembly 178*a*, 178*b*, 178*c* includes a board 180 and a LED 181.

As best shown in FIG. 3, the first LED assembly 178*a* includes an independent LED PCBA 192 supported by the light housing 172. The LED PCBA 192 receives the initial wires 186, 188 from the main PCBA 65, and the remaining LED assemblies 178*b*, 178*c* are powered/controlled from the wires 186, 188 coming from the LED PCBA 192. In the illustrated embodiment, the wires 186, 188 ultimately provide power to the LED assemblies 178*a*, 178*b*, 178*c* from the battery 34. In some embodiments, a power supply that provides power to the LED assemblies 178*a*, 178*b*, 178*c* via the wires 186, 188 is a second power supply separate from the battery 34. For example, the second power supply may be a coin cell battery or the like. In some embodiments, the second power supply may be configured to provide power to the LEDs but not to a motor or other on-tool electrical components (e.g., one-key technology, safety features, etc.). In yet other embodiments, the LED assemblies 178*a*, 178*b*, 178*c* may be replaced by diffusers coupled to one or more light sources (e.g., LEDs) within the power tool 10 via light pipes. In such embodiments, the diffusers emit light carried from the remote light sources by the light pipes. The light pipes may extend through the passage 170 in such embodiments (in place of the wires 186, 188).

The light housing 172 may include one or more lenses 196 to allow for the LEDs 181 to emit light through the lighting assembly 160 and to the front of the power tool 10 (FIG. 5). In some embodiments, the LED assemblies 178*a*, 178*b*, 178*c* may be arranged about a center point of the lighting assembly 160, and, in some instances, may be arranged about the axis 54 (FIG. 3). For example, the LED assemblies 178*a*, 178*b*, 178*c* may be evenly spaced in a circumferential direction about the axis 54 in 120 degree increments. This allows the LED assemblies 178*a*, 178*b*, 178*c* to illuminate a workpiece without casting shadows (e.g., from the tool bit). In other embodiments, the LED assemblies 178*a*, 178*b*, 178*c* may have other spacings and arrangements.

Referring now to FIGS. 6-10, the wires 186, 188 may be routed from the main PCBA 65, through the passage 170, and landed on the LED PCBA 192. The illustrated passage 170 extends from an inside of the primary housing 14 on one end to an inside of the light housing 172 on the other end. The wires 186, 188 are surrounded by sleeves 200 received in the passage 170. In the illustrated embodiment, the sleeves 200 are configured as plugs 200, which at least partially seal the passage 170. The plugs 200 may be stoppers, seals, and/or the like. In some embodiments, the plugs 200 are elastomeric (and thus, flexible). For example, the plugs 200 may be made of rubber. The plugs 200 may support the wires 186, 188 in the passage 170 and may also inhibit infiltration of debris (e.g., dust, lubricant, etc.) through the passage 170 in either direction. More specifically, supporting the wires 186, 188 includes preventing rubbing and wear during use, which may prolong the life of the power tool 10. In some embodiments, the plugs 200 may also be oversized to inhibit lubricant from leaking out of the interference fit formed between the secondary housing 22 and the intermediate case 156.

Figure 7:
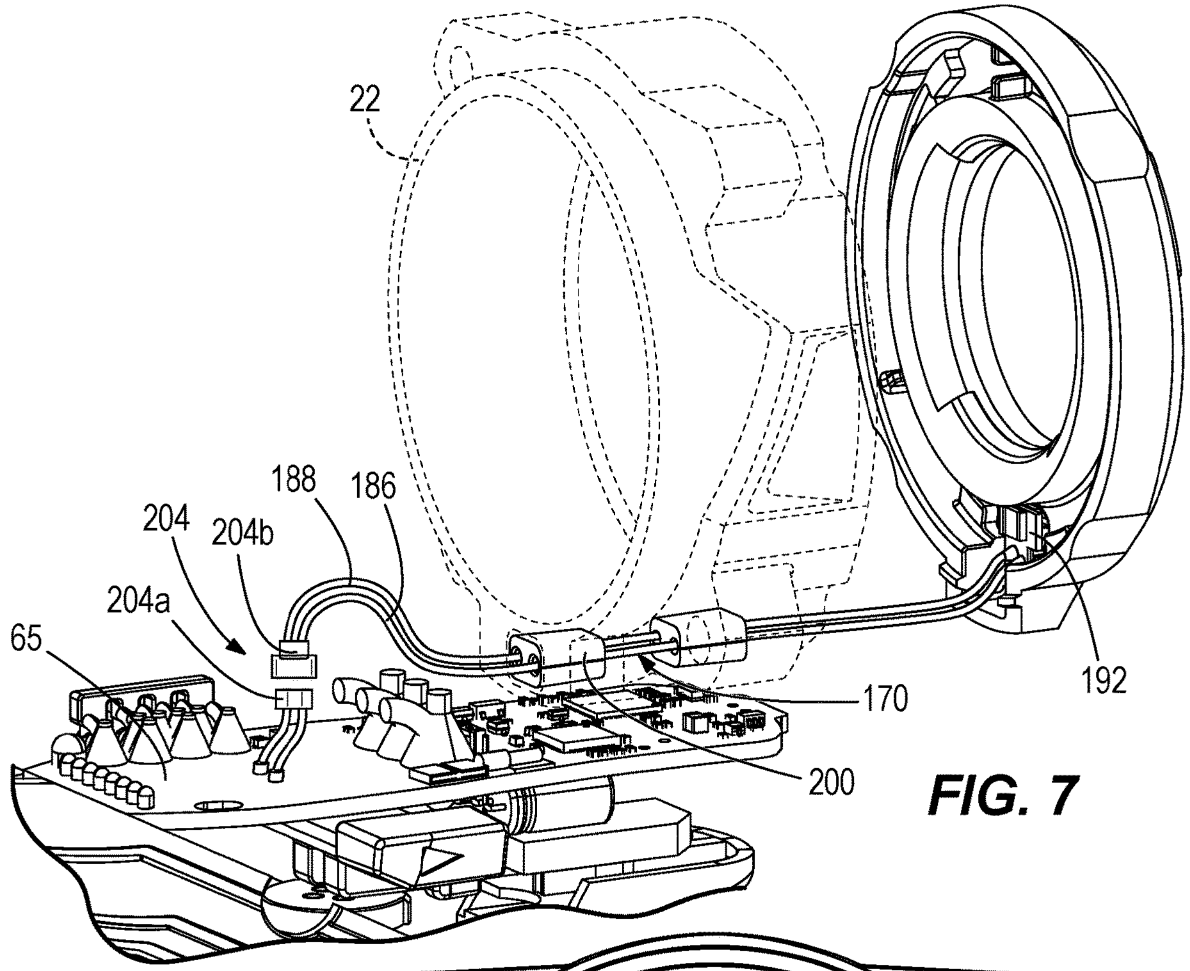
FIG. 7 is a perspective view of a portion of the power tool of FIG. 1, with some features hidden or transparent to isolate internal aspects of the power tool.

With reference to FIG. 7, the wires 186, 188 may optionally be spliced via a connector 204 positioned in the primary housing 14. Including the connector 204 allows for fewer and/or easier steps during the manufacturing process. In one example method, the wires 186, 188 may be connected (e.g., crimped, soldered, etc.) directly to the main PCBA 65, and a first portion of the connector 204*a* may be attached to an opposing end of the wires 186, 188. Separately, the wires 186, 188 may be directly connected to the LED PCBA 192, and a second portion of the connector 204*b* may be attached to opposing ends of those wires 186, 188. Finally, rather than having to include extra wire material to accommodate for final assembly, a builder may more simply attach the first and second connector portions 204*a*, 204*b* to complete the wiring. In some embodiments, the connector 204 may then be secured within the primary housing 14. In some instances, the primary housing 14 may be formed with a designated space or pocket for receiving the connector 204.

Figure 8:
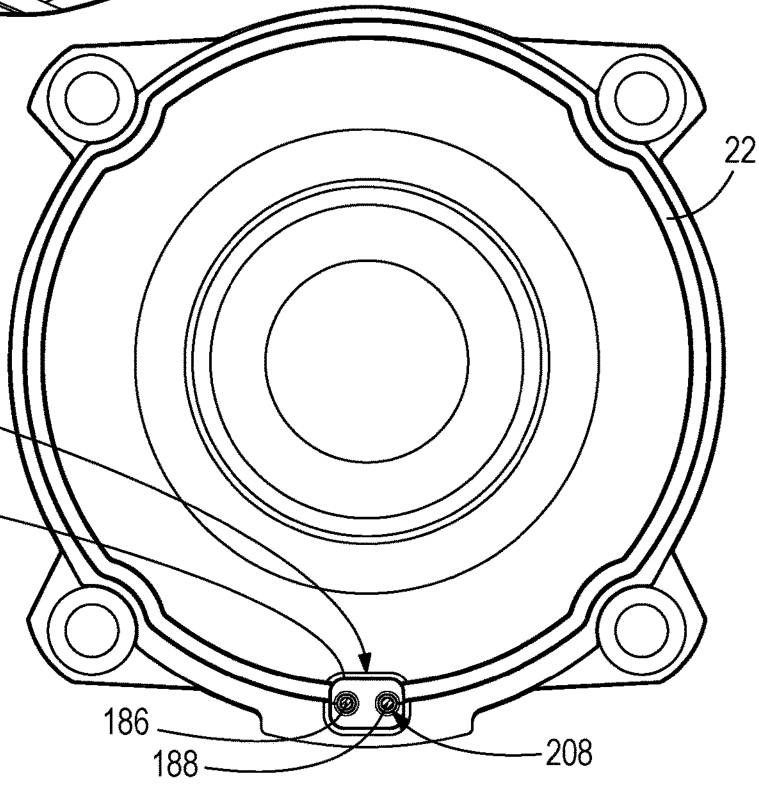
FIG. 8 is a front view of a housing member of the power tool of FIG. 1.

Referring briefly to FIG. 8, the plugs 200 may include recesses 208 extending through the plugs 200. The recesses 208, which may have a shape or cross-section similar to that of a round wire, may be slightly smaller than the wires 186, 188 to provide a secure fit between the plugs 200 and the wires 186, 188. Similarly, the plugs 200 may be slightly larger than the passage 170 for the same purpose. In the illustrated embodiment, the plugs 200 and the passage 170 are both polygonal. In other embodiments the plugs 200 and the passage 170 may have a different shape.

Figure 6:
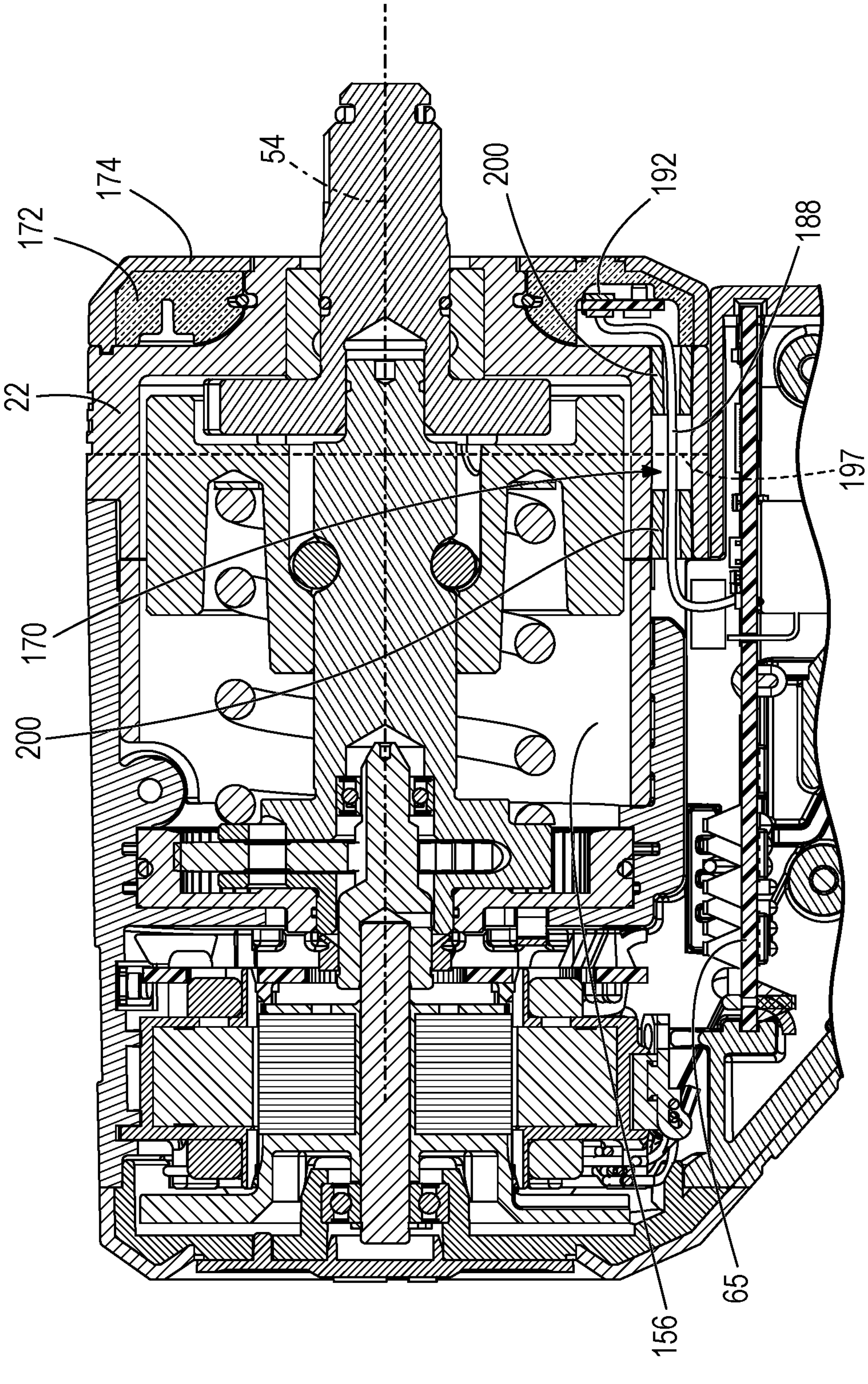
FIG. 6 is a partial cross-sectional view of the power tool of FIG. 1.

Referring to FIG. 6, the secondary housing 22 is integrally formed as a single piece in the illustrated embodiment, via a molding process. The molding process may be a molten metal molding process, such as casting. In other embodiments, the molding process may be a powdered metal molding process, such as compaction and sintering. The passage 170 is formed within the secondary housing 22 during the molding process. In some embodiments, the secondary housing 22 may be molded via a two-piece mold, having a parting line 197 extending perpendicular to the axis 54. In the illustrated embodiment, the parting line 197 extends through the center of the passage 170, although the parting line 197 may be located elsewhere in other embodiments. The illustrated passage 170 tapers outwardly from the parting line 197 toward each end of the passage 170. As such, the cross-sectional area of the passage 170 decreases from the rear end of the passage 170 to a minimum cross-sectional area at the parting line 197, and then increases from the parting line 197 to the front end of the passage 170. The passage 170 thus has draft angles, allowing inserts of the mold to form the passage 170 during molding, and then to be released and withdrawn from the passage 170 after molding. Molding the secondary housing 22, including the passage 170, may provide a lower manufacturing cost and/or higher manufacturing throughput than forming the secondary housing 22 and then subsequently machining the passage 170. In addition, the draft angles of the passage 170 may provide a wedging effect to compress and secure the plugs 200.

Figure 9:
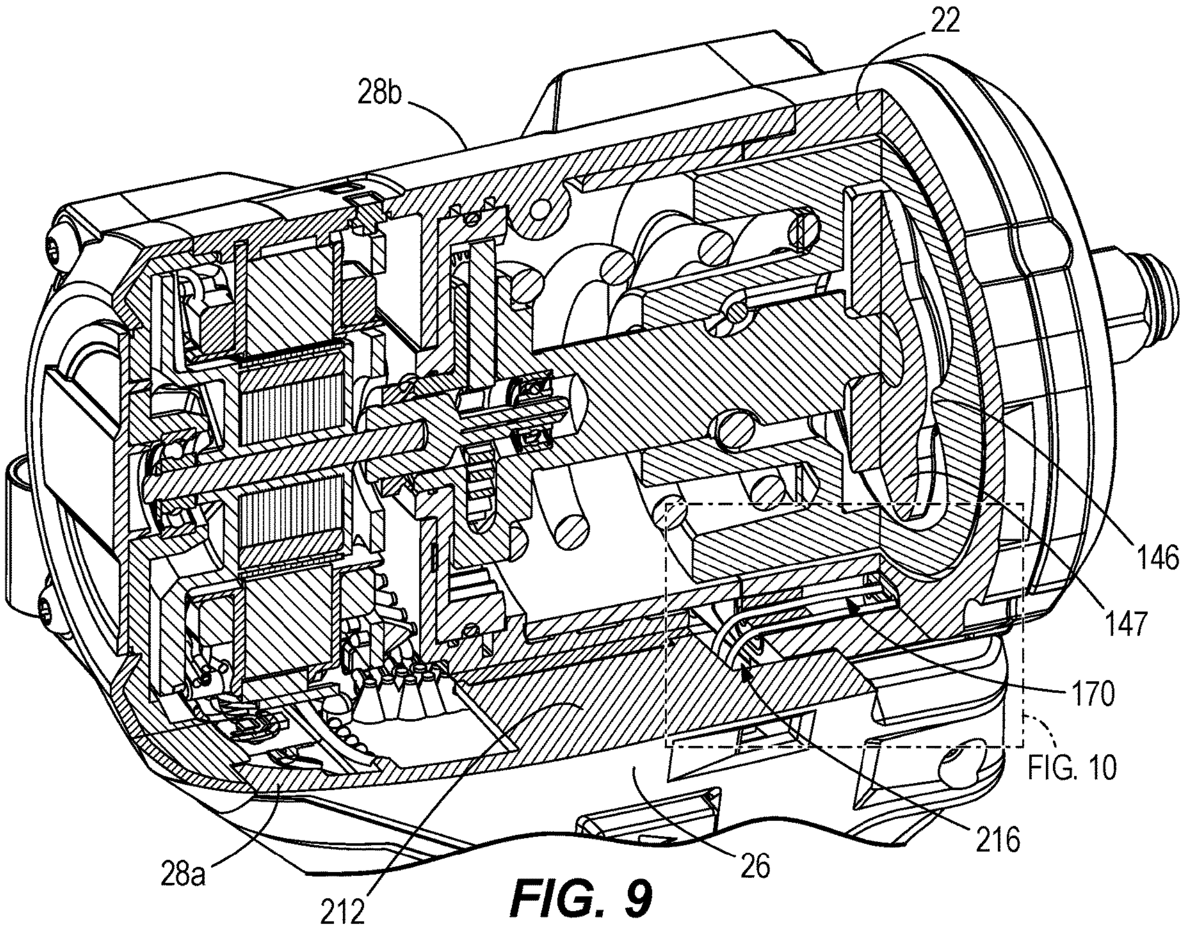
FIG. 9 is a partial section view the power tool of FIG. 1.
Figure 10:
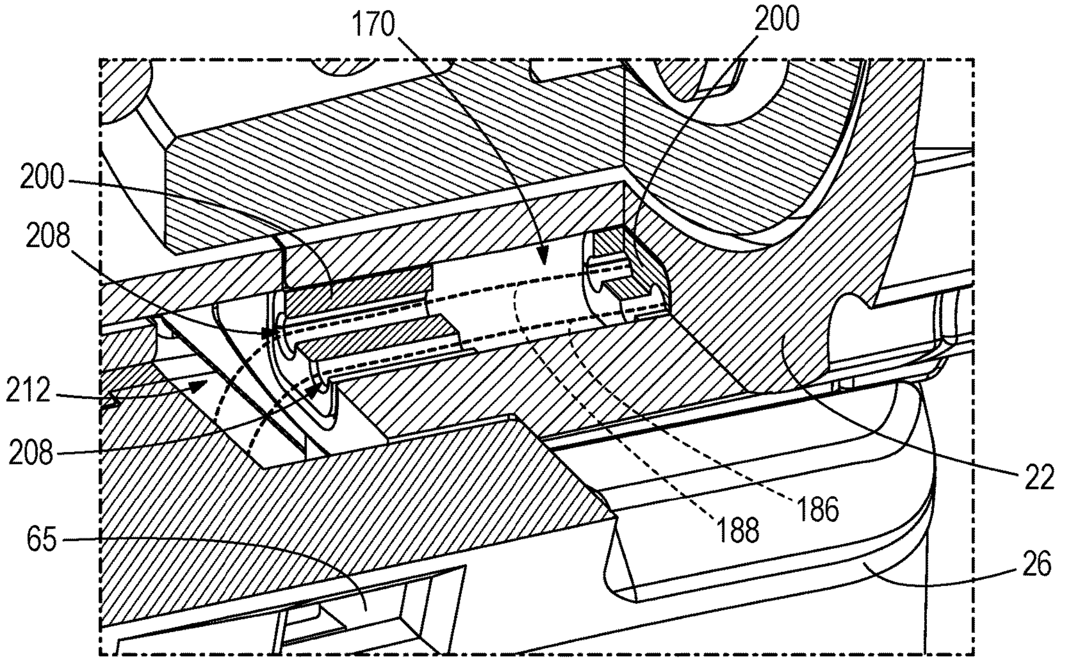
FIG. 10 is a magnified view of the callout box in FIG. 9.

Finally, with reference to FIGS. 9 and 10, the clamshell halves **28*a*, 28*b* may come together to form a partial barrier wall 212 between the secondary housing 22 and the handle portion 26. The clamshell halves 28*a*, 28*b* further provide an opening 216 just below an end of the passage 170 in the secondary housing 22. In some embodiments, the connector 204 may be stored just below the opening 216. In the illustrated embodiment, the opening 216 accommodates passage of the wires 186, 188 from the secondary housing 22 to the handle portion 26 and on to the main PCBA 65, which may be positioned near a top part of the handle portion 26 and oriented in an orientation generally parallel to the axis 54**.

In operation of the power tool 10, an operator depresses the trigger 62 to activate the motor 42, which continuously drives the gear assembly 66 and the camshaft 94 via the output shaft 50. As the camshaft 94 rotates, the cam balls 154 drive the hammer 130 to co-rotate with the camshaft 94, and the drive surfaces of hammer lugs 146 to engage, respectively, the driven surfaces of anvil lugs to provide an impact and to rotatably drive the anvil 126 and the tool element. After each impact, the hammer 130 moves or slides rearward along the camshaft 94, away from the anvil 126, so that the hammer lugs 146 disengage the anvil lugs.

As the hammer 130 moves rearward, the cam balls 154 situated in the respective cam grooves 150 in the camshaft 94 move rearward in the cam grooves 150. The spring 134 stores some of the rearward energy of the hammer 130 to provide a return mechanism for the hammer 130. After the hammer lugs 146 disengage the respective anvil lugs, the hammer 130 continues to rotate and moves or slides forwardly, toward the anvil 126, as the spring 134 releases its stored energy, until the drive surfaces of the hammer lugs 146 re-engage the driven surfaces of the anvil lugs to cause another impact.

When the operator operates the power tool 10, the lighting assembly 160 may illuminate (e.g., in response to the operator depressing the trigger 62) to illuminate the workpiece without casting shadows. Power for the lighting assembly 160 is supplied by the wires 186, 188 extending through the passage 170, which protects and guides the wires 186, 188 while providing a compact and direct routing between the lighting assembly 160 and the second PCBA 65.

Figure 11:
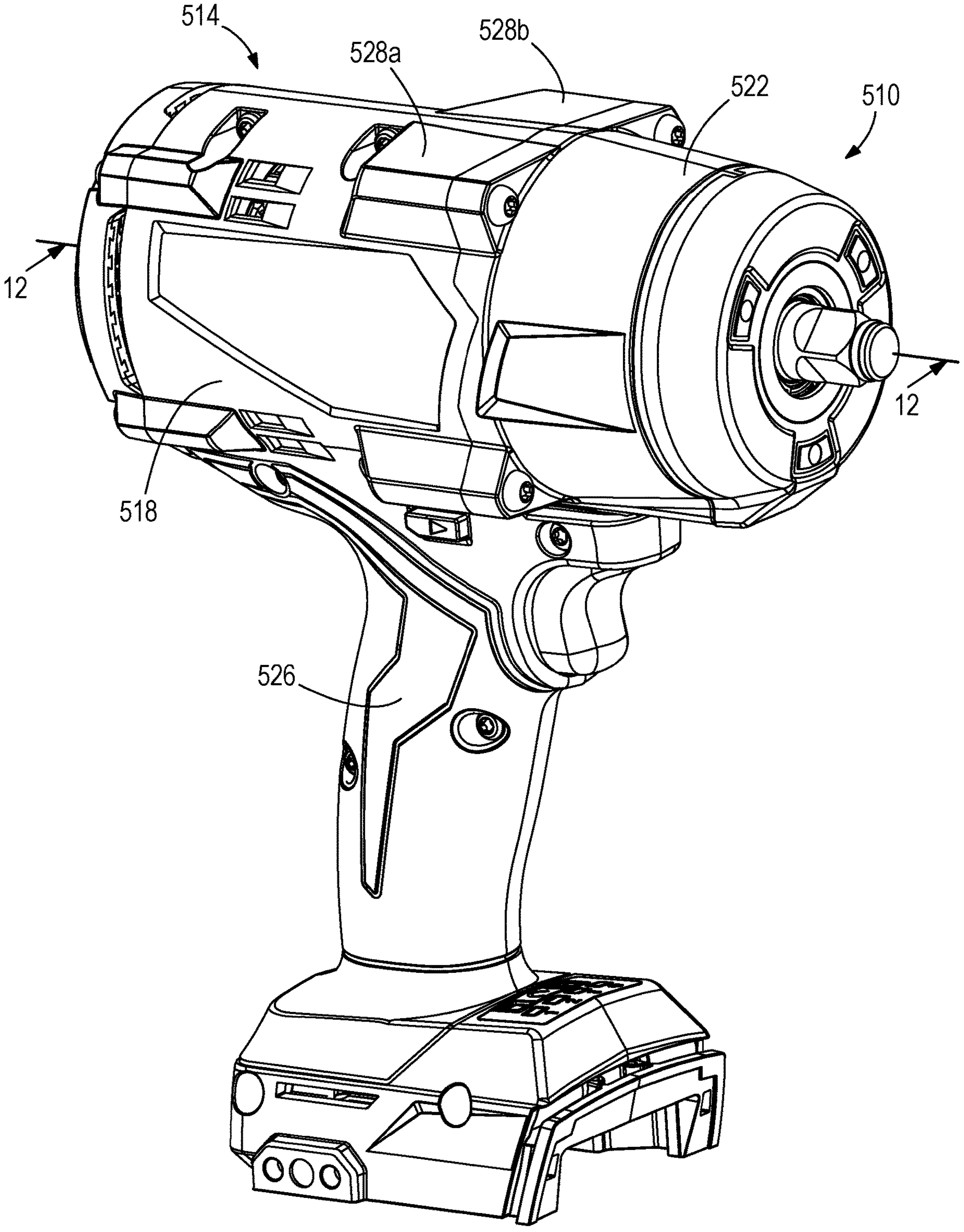
FIG. 11 is a perspective view of a power tool according to another embodiment of the disclosure.

FIG. 11 illustrates a power tool 510 according to another embodiment. The power tool 510 is similar in some aspects to the power tool 10 described above with reference to FIGS. 1-10, and features of the power tool 510 corresponding with features of the power tool 10 are given corresponding reference numerals plus '500.' The following description focuses primarily on differences between the power tool 510 and the power tool 10, and it should be understood that features of the power tool 10 and alternatives described herein may be incorporated into the power tool 510 where applicable, and vice versa. With the exception of differences described herein, the power tool 510 may additionally or alternatively include some or all of the features of the power tools 100, 800 described and illustrated in International Patent Application No. PCT/US2022/048534, in the name of Milwaukee Electric Tool Corporation, the entire content of which is incorporated herein by reference.

Referring to FIG. 11, the illustrated power tool 510 includes a primary housing 514 with a motor housing portion 518. A secondary housing 522 is coupled to the primary housing 514. The illustrated primary housing 514 includes a handle portion 526 extending downwardly from the motor housing portion 518 and terminating at a battery receptacle 538. In the illustrated embodiment, the handle portion 526 and the motor housing portion 518 are defined by cooperating first and second clamshell halves or housing portions **528*a*, 528*b***.

Figure 12:
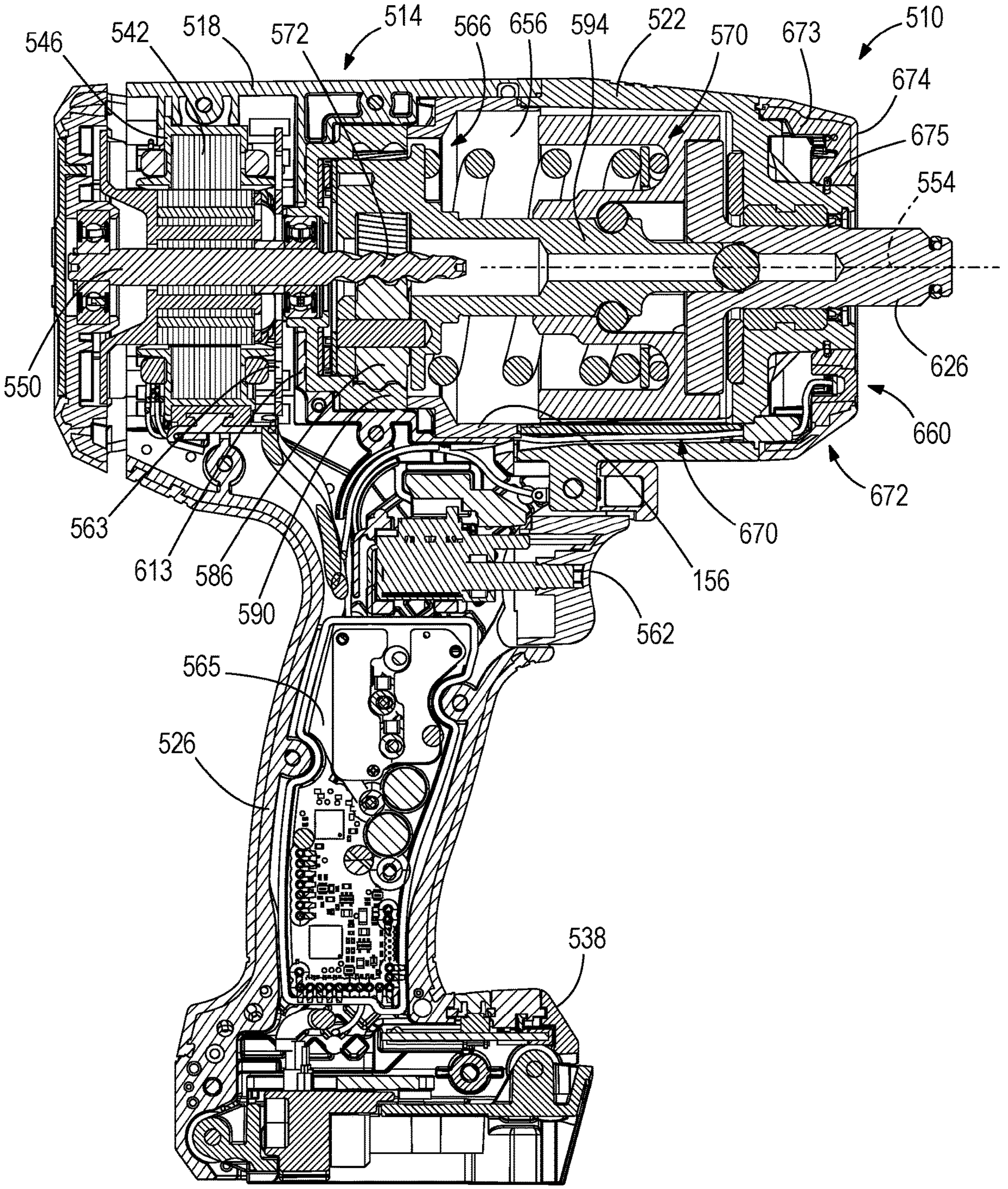
FIG. 12 is a cross-sectional view of the power tool of FIG. 11.

With reference to FIG. 12, a motor 542 is supported within the motor housing portion 518 and has a stator 546 with a plurality of coil windings and a rotor with an output shaft 550 that is rotatable about an axis 554 relative to the stator 546. A trigger 562 supported by the primary housing 514 is operable to electrically connect the motor 542 (e.g., via suitable control circuitry provided on one or more printed circuit board assemblies ("PCBAs")) and a battery (e.g., an 18-Volt rechargeable battery pack; not shown) to provide DC power to the motor 542.

In the illustrated embodiment, a first PCBA 563 is supported within the motor housing portion 518 of the primary housing 514. The illustrated first PCBA 563 extends perpendicular to the axis 554 and may include one or more Hall-Effect sensors, which provide feedback for controlling the motor 542. A second PCBA 565 is supported within the primary housing 14 (e.g., within the handle portion 526) and extends generally at an oblique angle relative to the axis 554. The second PCBA 565 is in electrical communication with the motor 542, a switch element of the trigger 562, and terminals of the battery receptacle 538. In the illustrated embodiment, the second PCBA 565 includes a plurality of semi-conductor switching elements (e.g., MOSFETs, IGBTs, or the like) that control and distribute power to windings in the stator 546 in order to cause rotation of the rotor and output shaft 550. The second PCBA 565 may also include one or more microprocessors, machine-readable, non-transitory memory elements, and other electrical or electronic elements for providing operational control to the power tool 510. In some embodiments, the first PCBA 563 may be omitted, and the motor 542 may be configured for sensorless control via the second PCBA 565. The positions of the first PCBA 563 and/or the second PCBA 565 within the primary housing 514 may vary in some embodiments.

Like the power tool 10, the illustrated power tool 510 includes a gear assembly 566 driven by the output shaft 550 and an impact mechanism or drive assembly 570 coupled to an output of the gear assembly 566. The gear assembly 566 provides a speed reduction between the output shaft 550 and an input of the drive assembly 570. The gear assembly 566 includes a pinion gear 572, which is integrally formed with the output shaft 550 in the illustrated embodiment, a plurality of planet gears 586 meshed with the pinion gear 572, and a ring gear 590 meshed with the planet gears 586 and rotationally fixed within the primary housing 514. A rearward facing side of the ring gear 590 is seated against a dividing wall 613 formed by the clamshell halves 528*a*, 528*b* (FIG. 5). The illustrated ring gear 590 is directly supported by the clamshell halves 528*a*, 528*b*. In other embodiments, the ring gear 590 may be supported by a gear case, which in turn may be supported by the clamshell halves 528*a*, 528*b*.

The planet gears 586 are coupled to a camshaft 594 of the drive assembly 570 such that the camshaft 594 acts as a planet carrier. Accordingly, rotation of the output shaft 550 rotates the planet gears 586, which then advance along the inner circumference of the ring gear 590 and thereby rotates the camshaft 594. The drive assembly 570 also includes an anvil 626, extending from the secondary housing 522, to which a tool element (e.g., a socket, not shown) can be coupled for performing work on a workpiece (e.g., a fastener). The drive assembly 570 is configured to convert the constant rotational force or torque provided by the gear assembly 566 to a striking rotational force or intermittent applications of torque to the anvil 626 in a manner similar to the drive assembly 70 described above.

Referring still to FIG. 12, the gear assembly 566 and drive assembly 570 may be coated with a lubricant, such as grease or oil, which assists in smooth operation of the power tool 510 by minimizing friction between movable components. As such, the power tool 510 includes an intermediate case 656 positioned in abutment with the secondary housing 522 at one end of the intermediate case 656 and positioned in abutment with the ring gear 590 at the other end of the intermediate case 656. In the illustrated embodiment, the intermediate case 656 is secured between the secondary housing 522 and the ring gear 590 with an interference fit that inhibits lubricant from escaping from the gear assembly 566 and the drive assembly 570.

The power tool 510 further includes a lighting assembly 660 coupled directly to the secondary housing 522. A passage 670 extends through the secondary housing 522, in a direction generally parallel to the axis 554. As described in greater detail below, wires for providing power and/or operational control to the lighting assembly 660 extend through the passage 670, beyond a rear end of the secondary housing 522, and ultimately to the second PCBA 565.

The lighting assembly 660 includes a light housing 672 with a body 673 and a cap 674. The cap 674 may be an elastomeric layer overmolded on the body 673 to provide the lighting assembly 660 with protection and impact resistance (e.g., from drops, etc.). In other embodiments, the cap 674 may be coupled to the body 673 via a snap-fit, adhesive, fasteners, or the like, or the cap 674 may be omitted. The illustrated light housing 672 is coupled to the secondary housing 522 by a retaining ring 675 (e.g., a snap ring) disposed in complementary grooves on the secondary housing 522 and the light housing 672 (FIG. 12). In other embodiments, the light housing 672 may be coupled to the secondary housing 522 in other ways.

Figure 13:
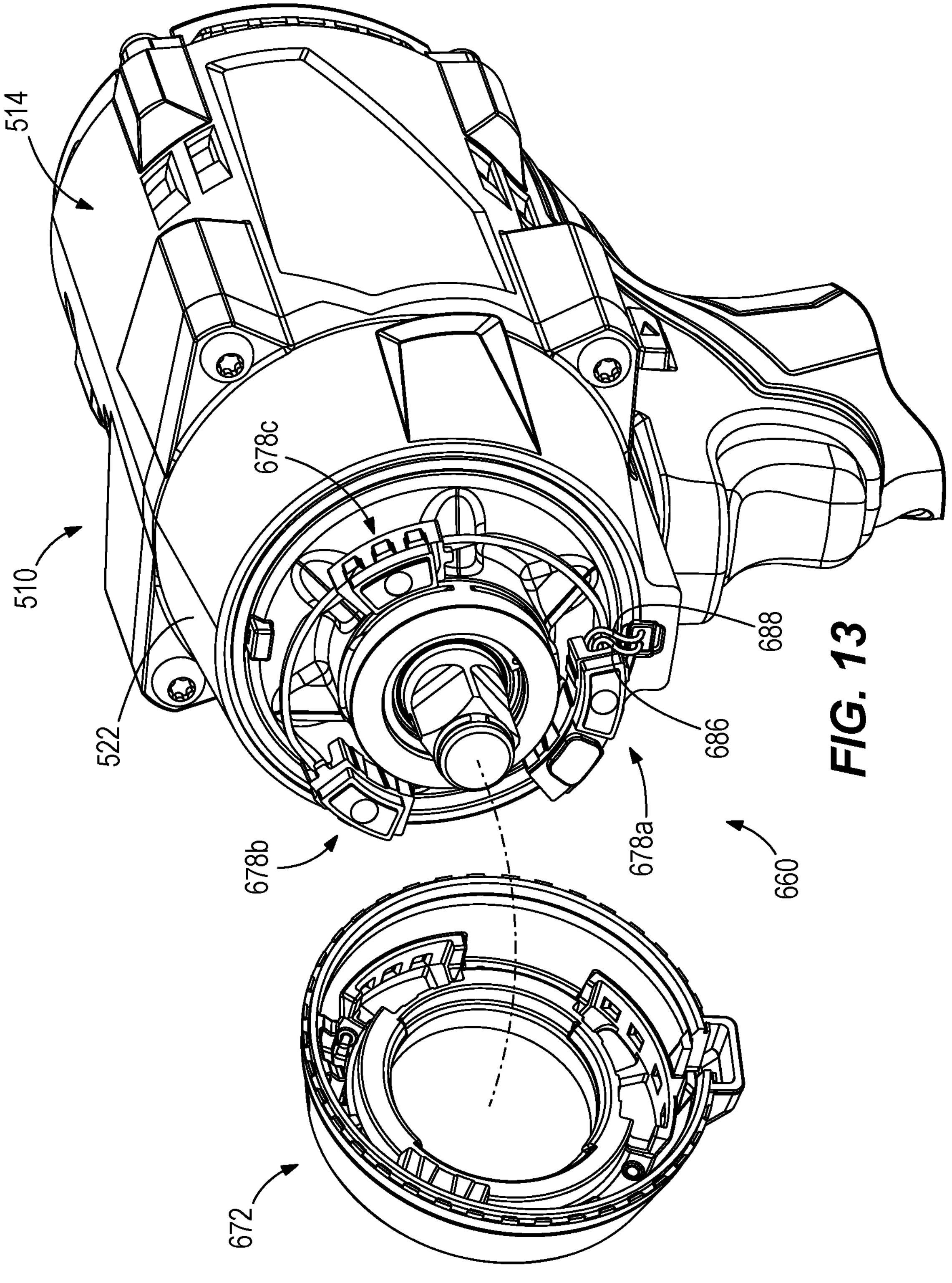
FIG. 13 is a partially exploded perspective view of the power tool of FIG. 11.

Referring to FIG. 13, the illustrated lighting assembly 660 includes multiple light-emitting diode ("LED") assemblies 678*a*, 678*b*, 678*c*, which may each be supported within the light housing 672. The LED assemblies 678*a*, 678*b*, 678*c* may be similar to the LED assemblies 178*a*, 178*b*, 178*c* and alternatives thereof described above. Power may be provided to each LED assembly 678*a*, 678*b*, 678*c* by wires 686, 688 routed through a passage 670 from the second PCBA 565 (FIG. 12). The passage 670 extends through the secondary housing 522, in a direction generally parallel to the axis 554.

The illustrated passage 670 extends from an inside of the primary housing 514 on one end to an inside of the light housing 672 on the other end and retains a plug 700 that may partially seal the passage 670. The plug 700 supports the wires 686, 688 in the passage 670 and may also inhibit infiltration of debris (e.g., dust, lubricant, etc.) through the passage 670 in either direction. More specifically, supporting the wires 686, 688 includes preventing rubbing and wear during use, which may prolong the life of the power tool 510.

Figure 14:
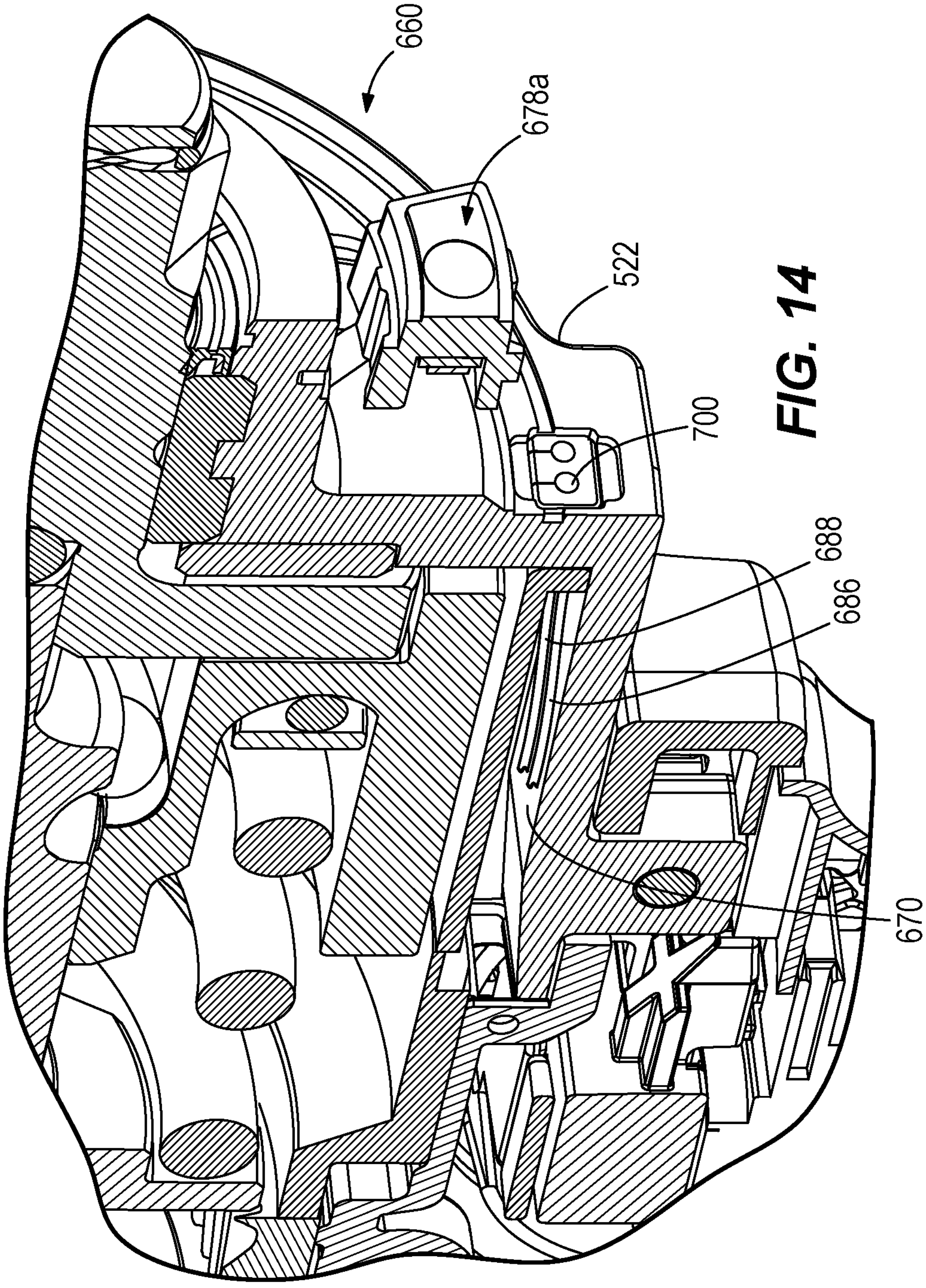
FIG. 14 is an enlarged perspective view illustrating a portion of a lighting assembly of the power tool of FIG. 11.
Figure 15:
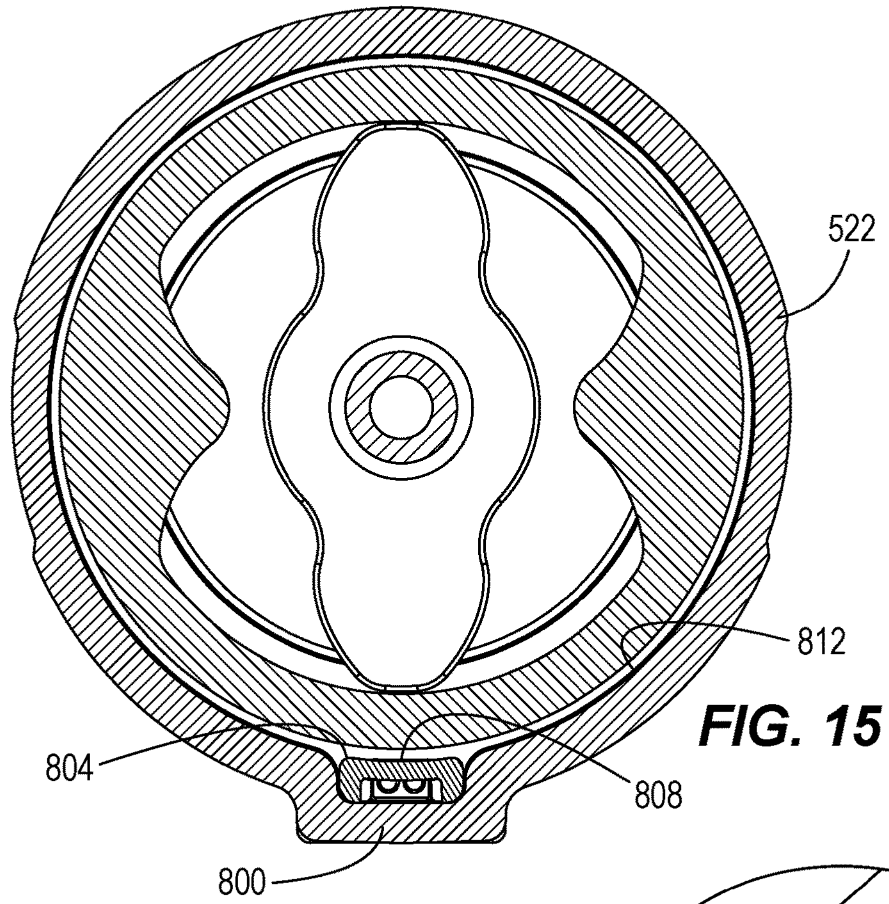
FIG. 15 is a cross-sectional view of a portion of the power tool of FIG. 11, illustrating a passageway accommodating wires to the lighting assembly.
Figure 16:
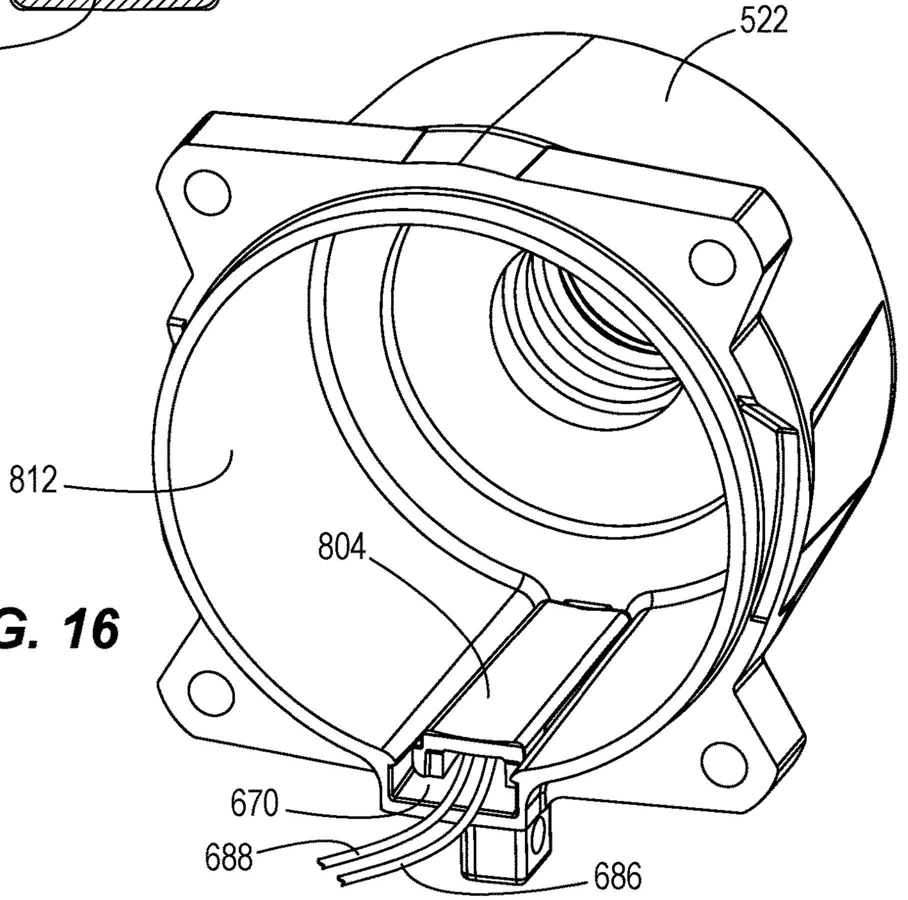
FIG. 16 is a rear perspective view of a secondary housing of the power tool of FIG. 11, further illustrating the passageway.

Referring to FIGS. 14-16, the passage 670 in the illustrated embodiment is defined between a generally U-shaped wall 800 extending along a bottom side of the secondary housing 522 and a generally U-shaped cover 804 coupled to the wall 800. In the illustrated embodiment, the wall 800 projects from the bottom side of the secondary housing 522 and extends in a front-rear direction parallel to the 554 (FIG. 12). An inner side of the wall 800 defines a recess in which the cover 804 is received. The cover 804 has a height approximately equal to a height of the recess such that a top wall 808 of the cover 804 is substantially flush with an interior cylindrical wall 812 of the secondary housing 522. As such, the cover 804 does not interfere with the movement or operation of the drive assembly 570. In some embodiments, the cover 804 is made of a first material (e.g., a plastic material) and the secondary housing 522 is made of a second material (e.g., a metal material). The cover 804 may be coupled to the wall 800 may a snap fit or interference fit within the recess, or via a sliding fit in other embodiments (e.g., with cooperating features, such as rails, to retain the cover 804 within the recess defined by the wall 800. During operation, the cover 804 protects the wires 686, 688 from the heat, lubricant, and motion of the drive assembly 570 within the interior of the secondary housing 522.

Figure 17:
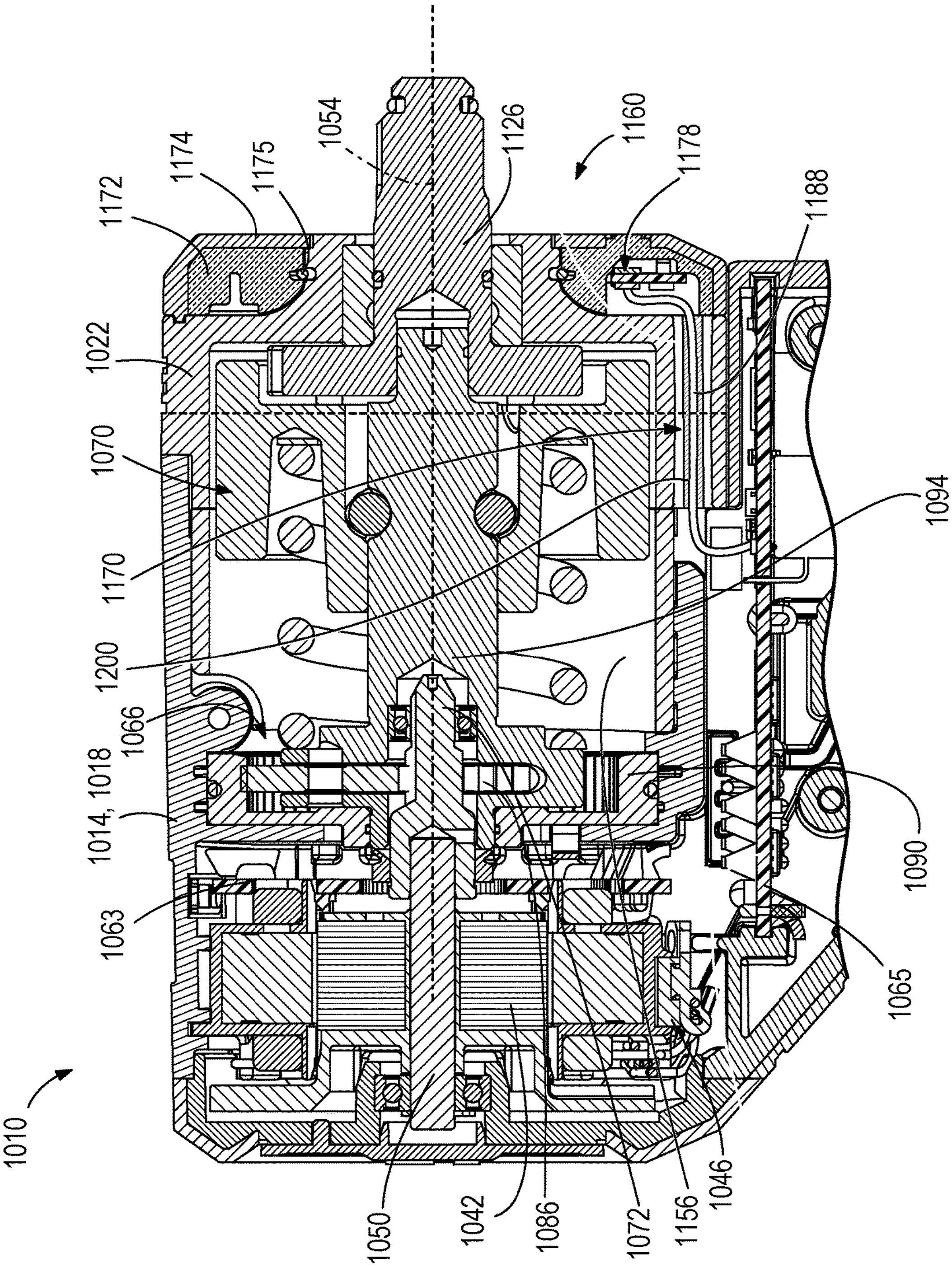
FIG. 17 is a cross-sectional view of a power tool according to another embodiment of the disclosure.

FIG. 17 illustrates a power tool 1010 according to another embodiment. The power tool 1010 is similar in some aspects to the power tool 10 described above with reference to FIGS. 1-10. The following description focuses primarily on differences between the power tool 1010 and the power tool 10, and it should be understood that features of the power tool 10 and alternatives described herein may be incorporated into the power tool 1010 where applicable, and vice versa. With the exception of difference described herein, the power tool 1010 may additionally or alternatively include some or all of the features of the power tools described and illustrated in International Patent Application No. PCT/US2022/048534, in the name of Milwaukee Electric Tool Corporation, the entire content of which is incorporated herein by reference.

The illustrated power tool 1010 includes a primary housing 1014 with a motor housing portion 1018. A secondary housing 1022 is coupled to the primary housing 1014. A motor 1042 is supported within the motor housing portion 1018 and has a stator 1046 with a plurality of coil windings and a rotor with an output shaft 1050 that is rotatable about an axis 1054 relative to the stator 1046. A first printed circuit board assembly ("PCBA") 1063 is supported within the motor housing portion 1018 of the primary housing 1014. The illustrated first PCBA 1063 extends perpendicular to the axis 1054 and may include one or more Hall-Effect sensors, which provide feedback for controlling the motor 1042. A second PCBA 1065 is supported within the primary housing 1014 an extends generally parallel to the axis 1054. The second PCBA 1065 is in electrical communication with the motor 1042.

Like the power tool 10, the illustrated power tool 1010 includes a gear assembly 1066 driven by the output shaft 1050 and an impact mechanism or drive assembly 1070 coupled to an output of the gear assembly 1066. The gear assembly 1066 provides a speed reduction between the output shaft 1050 and an input of the drive assembly 1070. The gear assembly 1066 includes a pinion gear 1072, which is integrally formed with the output shaft 1050 in the illustrated embodiment, a plurality of planet gears 1086 meshed with the pinion gear 1072, and a ring gear 1090 meshed with the planet gears 1086 and rotationally fixed within the primary housing 1014. In the illustrated embodiment, the ring gear 1090 is directly supported by the primary housing 1014. In other embodiments, the ring gear 1090 may be supported by a gear case, which in turn may be supported by the primary housing 1014.

The planet gears 1086 are coupled to a camshaft 1094 of the drive assembly 1070 such that the camshaft 1094 acts as a planet carrier. Accordingly, rotation of the output shaft 1050 rotates the planet gears 1086, which then advance along the inner circumference of the ring gear 1090 and thereby rotates the camshaft 1094. The drive assembly 1070 also includes an anvil 1126, extending from the secondary housing 1022, to which a tool element (e.g., a socket, not shown) can be coupled for performing work on a workpiece (e.g., a fastener). The drive assembly 1070 is configured to convert the constant rotational force or torque provided by the gear assembly 1066 to a striking rotational force or intermittent applications of torque to the anvil 1126 in a manner similar to the drive assembly 70 described above.

The gear assembly 1066 and drive assembly 1070 may be coated with a lubricant, such as grease or oil, which assists in smooth operation of the power tool 1010 by minimizing friction between movable components. As such, the power tool 1010 includes an intermediate case 1156 positioned in abutment with the secondary housing 1022 at one end of the intermediate case 1156 and positioned in abutment with the ring gear 1090 at the other end of the intermediate case 1156. In the illustrated embodiment, the intermediate case 1156 is secured between the secondary housing 1022 and the ring gear 1090 with an interference fit that inhibits lubricant from escaping from the gear assembly 1066 and the drive assembly 1070.

The power tool 1010 further includes a lighting assembly 1160 coupled directly to the secondary housing 1022. A passage 1170 extends through the secondary housing 1022, in a direction generally parallel to the axis 1054. As described in greater detail below, wires for providing power and/or operational control to the lighting assembly 1160 extend through the passage 1170, beyond a rear end of the secondary housing 1022, and ultimately to the second PCBA 1065.

The lighting assembly 1160 includes a light housing 1172 with a cap 1174. The cap 1174 may be an elastomeric layer overmolded on a body of the light housing 1172 to provide the lighting assembly 1160 with protection and impact resistance (e.g., from drops, etc.). In other embodiments, the cap 1174 may be coupled to the body of the light housing 1172 via a snap-fit, adhesive, fasteners, or the like, or the cap 1174 may be omitted. The illustrated light housing 1172 is coupled to the secondary housing 1022 by a retaining ring 1175 (e.g., a snap ring) disposed in complementary grooves on the secondary housing 1022 and the light housing 1172. In other embodiments, the light housing 1172 may be coupled to the secondary housing 1022 in other ways.

The illustrated lighting assembly 1160 includes multiple light emitting diode ("LED") assemblies, similar to the LED assemblies **178*a*, 178*b*, 178*c*, although only one LED assembly 1178 is illustrated in FIG. 17. The LED assemblies 1178 may each be supported within the light housing 1172. The LED assemblies 1178 may be similar to the LED assemblies 178*a*, 178*b*, 178*c* of FIG. 3 and alternatives thereof described above. Power may be provided to each LED assembly 1178 by wires 1188 routed through the passage 1170 from the second PCBA 1065**.

The illustrated passage 1170 extends from an inside of the primary housing 1014 on one end to an inside of the light housing 1172 on the other end. A sleeve 1200 surrounds and protects the wires 1188 within the passage 1170. In some embodiments, the entire portion of the wire 1188 that extends through the passage 1170 is surrounded by the sleeve 1200 (i.e., the sleeve 1200 extends an entire length of the passage 1170). In some embodiments, the sleeve 1200 may extend beyond the ends of the passage 1170. The sleeve 1200 may prevent rubbing and wear on the wires 1188 during use of the power tool 1010.

In the illustrated embodiment, the sleeve 1200 is made of fiberglass. Specifically, a single layer of fiberglass surrounds the wires 1188. In some embodiments, multiple layers of fiberglass or other types of sleeves may surround the wires 1188. In further embodiments, the wires 1188 may be surrounded and/or supported by multiple different sleeves, such as the plugs 200 illustrated in FIG. 6 and the sleeve 1200 illustrated in FIG. 17.

Although the disclosure has been described in detail with reference to certain example embodiments, variations and modifications exist within the scope and spirit of one or more independent aspects of the disclosure as described. For example, the lighting assemblies 160, 660, 1160 described and illustrated herein may be incorporated into other types of power tools, such as drills, powered screwdrivers, ratchet tools, precision torque tools, and the like.

Various features of the disclosure are set forth in the following claims. When used in this specification and claims, the terms "comprises" and "comprising" and variations thereof mean that the specified features, steps or integers are included. The terms are not to be interpreted to exclude the presence of other features, steps or components.

What is claimed is:

1. A power tool comprising:
- a housing including a primary housing and a secondary housing coupled to the primary housing;
- a motor supported within the primary housing;
- an output member driven by the motor and extending from the secondary housing;
- a circuit board assembly supported within the primary housing;
- a passageway at least partially formed by the secondary housing; and
- a lighting assembly coupled to the secondary housing, the lighting assembly including
  - a light source configured to illuminate a workpiece,
  - a wire extending from the circuit board assembly to the lighting assembly through the passageway, and a sleeve positioned in the passageway and completely surrounding at least a portion of the wire in a circumferential direction of the wire.

2. The power tool of claim 1, wherein the primary housing includes a motor housing portion in which the motor is supported and a handle portion extending from the motor housing portion, and wherein the circuit board assembly is supported within the handle portion.

3. The power tool of claim 1, wherein the passageway includes a first end, a second end opposite the first end, and an intermediate portion between the first and second ends, and wherein a cross-sectional area of the passageway increases from the intermediate portion toward the first end.

4. The power tool of claim 3, wherein the cross-sectional area of the passageway increases from the intermediate portion toward the second end, such that the intermediate portion defines a minimum cross-sectional area of the passageway.

5. The power tool of claim 4, wherein the sleeve is a first sleeve received between the first end and the intermediate portion, and wherein the power tool further comprises a second sleeve received between the second end and the intermediate portion.

6. The power tool of claim 5, wherein the first sleeve and the second sleeve are plugs that are compressed within the passageway.

7. The power tool of claim 4, wherein the secondary housing is molded using a mold assembly, and wherein a parting line of the mold assembly extending through the intermediate portion.

8. The power tool of claim 1, wherein the light source is a first light source, and wherein the lighting assembly further includes a second light source and a third light source.

9. The power tool of claim 8, wherein the first, second, and third light sources are offset from one another by 120 degrees.

10. The power tool of claim 1, wherein the secondary housing includes a wall defining a recess, and wherein the power tool further comprises a cover received within the recess.

11. The power tool of claim 10, wherein the passageway is defined between the cover and the wall.

12. The power tool of claim 10, wherein the wall and the cover are generally U-shaped.

13. The power tool of claim 10, wherein the secondary housing includes a cylindrical interior surface, and wherein the cover includes a top wall substantially flush with the cylindrical interior surface.

14. The power tool of claim 10, wherein the secondary housing and the cover comprise different materials.

15. The power tool of claim 1, wherein the sleeve is made of fiberglass.

16. The power tool of claim 15, wherein the output member is configured to rotate about an axis, and wherein both the circuit board and the passageway extend parallel to the axis.

17. The power tool of claim 15, further comprising a drive assembly having a camshaft driven by the motor and a hammer configured to reciprocate along the camshaft, and wherein the cover separates the wire from the hammer.

18. A power tool comprising:

a housing including a primary housing and a secondary housing coupled to the primary housing;

a motor supported within the primary housing;

an output member driven by the motor and extending from the secondary housing;

a circuit board assembly supported within the primary housing;

a passageway defined between a wall extending along a bottom side of the secondary housing and a cover disposed inside the secondary housing; and a lighting assembly coupled to the secondary housing, the lighting assembly including a light source configured to illuminate a workpiece, and a wire extending from the circuit board assembly to the lighting assembly through the passageway.

19. A power tool comprising:

a housing including a primary housing and a secondary housing coupled to the primary housing;

a motor supported within the primary housing;

an output member driven by the motor about an axis and extending from the secondary housing;

a circuit board assembly supported within the primary housing;

a passageway defined by a bore extending through the secondary housing in a direction parallel to the axis; and a lighting assembly coupled to the secondary housing, the lighting assembly including a light source configured to illuminate a workpiece, a wire extending from the circuit board assembly to the lighting assembly through the passageway, and a sleeve positioned in the passageway and completely surrounding at least a portion of the wire in a circumferential direction of the wire.

20. The power tool of claim 19, wherein the sleeve is made of fiberglass.

* * * * *